United States Patent [19]
Thorndyke

[11] Patent Number: 6,038,965
[45] Date of Patent: Mar. 21, 2000

[54] BARBECUE GRILL

[76] Inventor: Robert J. Thorndyke, Thorsens Projects Canada, Ltd., 2 Rogers Road, Site M Box #4, R.R. #3 Brighton, Ontario, Canada, K0K 1H0

[21] Appl. No.: 09/404,247

[22] Filed: Sep. 22, 1999

Related U.S. Application Data

[60] Provisional application No. 60/101,435, Sep. 22, 1998.

[51] Int. Cl.⁷ .............................. A47J 37/00; A47J 37/04; A47J 37/07
[52] U.S. Cl. .................... 99/340; 99/421 H; 99/421 HH; 99/447; 99/449; 99/450; 99/482; 126/25 R; 126/9 R
[58] Field of Search .............................. 99/339, 340, 352, 99/355, 400, 401, 419–421 V, 444–450, 481, 482; 126/25 R, 9 R, 41 R, 25 AA; 426/523

[56] References Cited

U.S. PATENT DOCUMENTS

| | | |
|---|---|---|
| 3,103,160 | 9/1963 | Forniti et al. . |
| 3,175,549 | 3/1965 | Bergsten ................................ 126/25 R |
| 3,208,808 | 9/1965 | Knapp . |
| 3,550,525 | 12/1970 | Rabello .................................. 99/446 X |
| 3,611,912 | 10/1971 | Choc ...................................... 99/340 X |
| 3,742,838 | 7/1973 | Luschen et al. . |
| 3,783,855 | 1/1974 | Newinger ............................... 126/25 R |
| 3,999,472 | 12/1976 | Einto ........................................ 99/340 |
| 4,120,237 | 10/1978 | Mecherlen ................................ 99/340 |
| 4,177,720 | 12/1979 | Schmidt . |
| 4,226,177 | 10/1980 | Schmidt . |
| 4,338,912 | 7/1982 | Gaskins .................................. 126/25 R |
| 4,442,824 | 4/1984 | Amici ....................................... 126/9 R |
| 4,730,597 | 3/1988 | Hottenroth et al. .................. 126/41 R |
| 5,178,059 | 1/1993 | Eschlboeck et al. . |
| 5,184,540 | 2/1993 | Riccio . |
| 5,333,540 | 8/1994 | Mazzocchi ............................ 99/427 V |
| 5,361,685 | 11/1994 | Riccio . |
| 5,431,093 | 7/1995 | Dodgen ................................. 99/427 X |
| 5,465,653 | 11/1995 | Riccio . |
| 5,499,574 | 3/1996 | Esposito .................................... 99/339 |
| 5,536,518 | 7/1996 | Rummel .................................. 426/523 |

FOREIGN PATENT DOCUMENTS 2298299 8/1976 France .

*Primary Examiner*—Timothy Simone
*Attorney, Agent, or Firm*—Richard C. Litman

[57] ABSTRACT

A portable barbecue grill apparatus has multiple functions including barbecuing, baking, roasting, and pan broiling, some of which can be accomplished simultaneously on joined cooking elements. The grill apparatus can have an extendable rear lid having a rotisserie attached to a base. Alternatively, a pair of slotted side plates attached to the lid and covered by a heat shield can permit the spacing of the spit from the burner in the lid according to the size of the rotating fool. The lid and base each contain heating elements energized by one or two portable propane tanks.

12 Claims, 24 Drawing Sheets

BARBECUE GRILL

CROSS-REFERENCE TO RELATED APPLICATION

This application claims the benefit of U.S. Provisional Patent Application Ser. No. 60/101,435, filed Sep. 22, 1998.

BACKGROUND OF THE INVENTION

1. FIELD OF THE INVENTION

The present invention relates to a portable barbecue grill apparatus which is capable of performing multiple cooking functions on a base and a hinged lid which can be arranged either in a right-angled or horizontal position and heated by separate burners.

2. DESCRIPTION OF RELATED ART

The related art of interest describe various barbecue grill devices, but none of the art either teaches or suggests a barbecue grill capable of performing multiple cooking functions simultaneously on separate burners and which also includes a rotisserie. The related art will be discussed in the order of perceived relevance to the present invention.

U.S. Pat. Nos. 4,177,720 and 4,226,177, issued on Dec. 11, 1979 and Oct. 7, 1980, respectively, to Klaus Schmidt, describe a portable grilling device using charcoal. The unit has a square-shaped top cover and a bottom cover with both covers used as a grill with grates. A latch structure permits the positioning of the covers horizontally or with the top cover normal to the other cover. The latch structures on both sides hold arms for positioning the spit arms. Three leg bails are provided with two bails on the bottom cover for supporting each cover above a supporting surface. The portable grilling device is distinguishable for its lightweight construction and lack of a rotisserie.

French Patent Application No. 2,298,299 published on Aug. 20, 1976, for Moulinex S. A. describes a slim line electric spit roaster with an upwardly foldable spit support and a front which may be closed by a door lockable up or down, pivoting partially into the casing and used as a drip catcher with a removable drip pan. The unit can be positioned upright on a horizontal surface or hung on a wall. The electric heating control is on one side, with the electric heating element positioned in the rear in a zig zag pattern. The apparatus is distinguishable for its single utility as a spit roaster energized by electricity.

U.S. Pat. No. 3,208,808 issued on Sep. 28, 1965, to Robert S. Knapp describes an electric barbecue unit including a shelved stand. A sheet metal oven body with a top cover opens upwards and a front door opens forwardly. The device has two racks. A broiler rack with a rotisserie spit is provided in a stack under a barbecue rack with an electric heating element under it. The electric barbecue unit is distinguishable for its electric heating for broiling, barbecuing and baking, and the rotisserie included in one unit with a vertical arrangement of functional cooking parts.

U.S. Pat. No. 3,103,160 issued on Sep. 10, 1963, to Philip M. Forniti, et al., describes a combination picnic grill and space heater fueled by bottled propane gas. The unit can be positioned upright for broiling and warming of cooked food or inverted for frying or grilling. The casing must be in the shape of a frustum of a rectangular right pyramid. The bottled propane tank is attached to the rear panel and to an inside burner unit. Only in the upright position is the aluminum warming shelf with perforations used along with a rack and a pan. In the inverted position, the pan is positioned on top with the rack underneath. Other cooking functions available are toasting and baking. The combination cooking device is distinguishable for its unique shape of the casing and open top (bottom) and front regions.

U.S. Pat. No. 5,178,059 issued on Jan. 12, 1993, to Manfred Eschlboeck, et al., describes a cooking apparatus for grilling meat, fish and vegetables in a seasoned garnishing liquid, such as oils, soups or water, by an electric heating blanket disposed below the liquid. A cover has a pressing plate which presses the food onto a food product holding plate which is pushed down on the penetrating tines of a bottom plate. The cooking apparatus is distinguishable for its singular deep liquid cooking.

U.S. Pat. No. 3,742,838 issued on Jul. 3, 1973, to Fred H. Luschen, et al., describes a vertical grill device on a fixed post for cooking food by charcoal or heated rocks. A housing openable on top encloses and supports a rotatable food holding basket with an open grillwork and a pair of vertical heating material holding members adjustably positionable on opposite sides of the food holding basket. In a modified embodiment, an electric motor driven spit is positioned between the heating elements and a drain trough and an external drain pan are provided for collecting the drippings. The device is distinguishable for its vertical heating elements in a fixed housing.

U.S. Pat. Nos. 5,184,540, 5,361,685 and 5,465,653 issued on Feb. 9, 1993, Nov. 8, 1994 and Nov. 14, 1995, respectively, to Renato Riccio describe a large cooking apparatus with a fireplace in a housing, and includes a rotisserie with multiple spits and a reclamation trap. The heat can be supplied by either gaseous fuel or solid fuel. The large apparatus is distinguishable for its limitation for use in business establishments in cooking multiple items on a plurality of spits.

None of the above inventions and patents, taken either singly or in combination, is seen to describe the instant invention as claimed.

SUMMARY OF THE INVENTION

The invention is a portable, multi-function barbecue grill apparatus. The apparatus has a hinged lid with a rotisserie attached to a base. The lid and base each contain heating elements which can be heated either by individually attached propane tanks or a separate larger tank. The lid opens and positions at 90° and 180° with respect to the base. In one embodiment, each of a pair of tubes is mounted on either side of the base and provides a track for lid support members. The lid moves horizontally rearward from the base when the support members slide through the tubes. The rearward, horizontal movement of the lid increases space for food placed on the base and on the rotisserie. The barbecue grill apparatus can cook foods by baking, boiling, broiling, roasting, toasting, and pan-broiling. The barbecue grill apparatus can, for example, simultaneously barbecue and pan cook on the base and cook on the rotisserie heated by the lid. In another embodiment, a pair of slotted and notched side plates are attached to the lid positioned at 90° for supporting a rotisserie unit by adjustable supports movable horizontally to adjust the spacing of the spit to the burners according to the size of the food being rotated. A four-piece heat shield is also added over the side plates and the food for increasing the radiated heat and preventing splattering.

Accordingly, it is a principal object of the invention to provide a barbecue grill apparatus which is portable and adaptable to bake, boil, broil, roast, toast, and pan-broil on a grid, and utilize a rotisserie.

It is another object of the invention to provide a barbecue grill apparatus with a lid that opens and fixes at 90° and 180° positions with respect to a base.

It is a further object of the invention to provide a barbecue grill apparatus which can simultaneously barbecue and pan cook on the base and cook on a rotisserie heated by the lid.

Still another object of the invention is to provide a barbecue grill apparatus fueled by at least one propane tank for both sides of the cooking apparatus or alternatively employ an integrated propane tank for each of the heating elements of the lid and the base.

Yet another object of the invention is to provide a barbecue grill apparatus with a lid stand, an extendable lid and a detachable heat shield for accommodation of a rotisserie attached to perforated side plates.

A final object of the invention is to provide a rotisserie unit positioned on notches on side plates having an array of horizontal slots for positioning the spit for accommodation of various sized food rotating under a heat shield.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
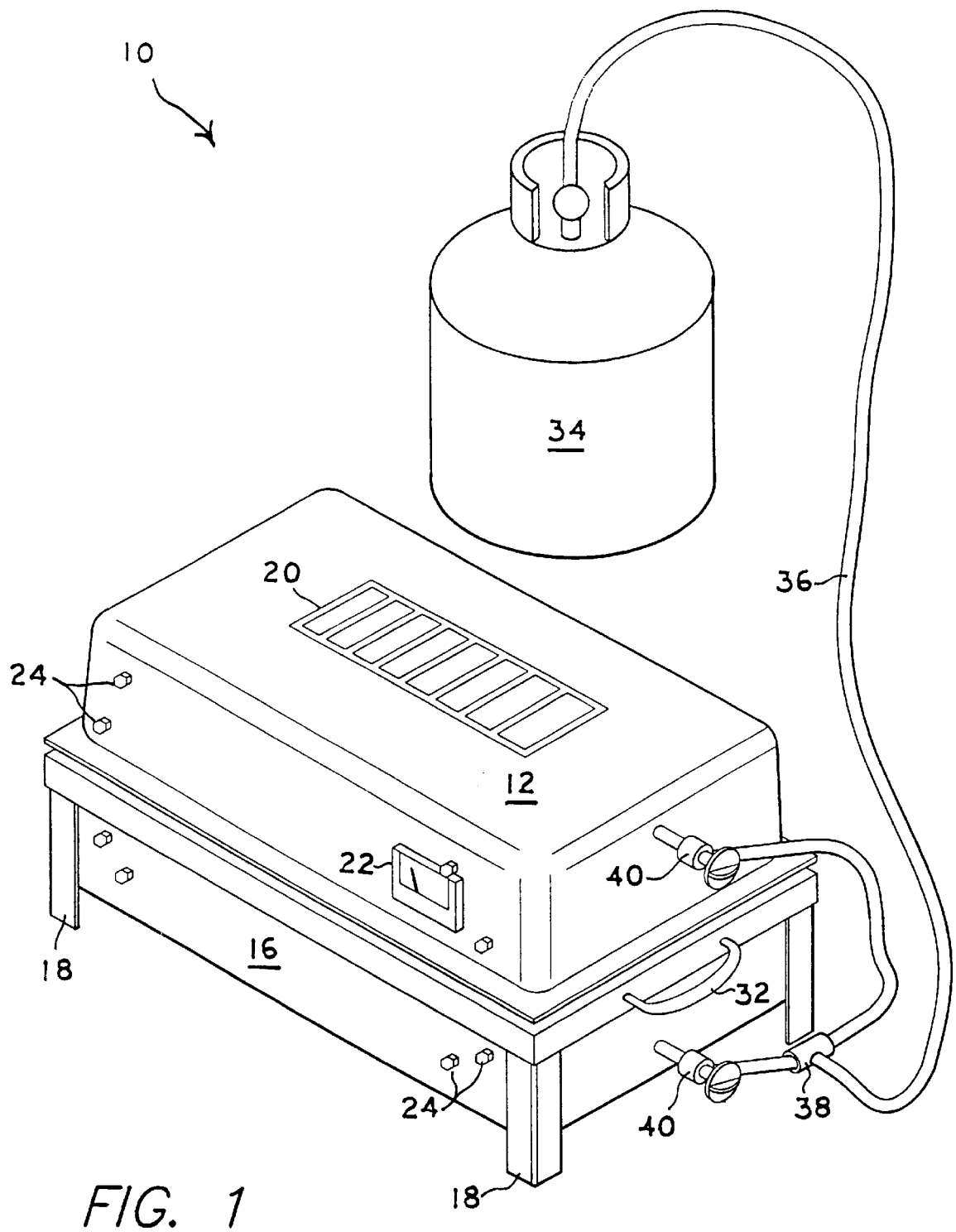
FIG. 1 is an environmental, perspective view of a first embodiment of a barbecue grill system according to the present invention in a closed position.

The present invention presents manifold cooking and associated cooking uses from one portable cooking apparatus by virtue of a hinged lid and base having separate gas burners.

FIGS. 1 to 9 are drawn to a first embodiment of a barbecue grill 10 with a lid casing 12 having a non-extendable hinge 14 and hinged to a base casing 16 with four legs 18 at its corners. The lid casing 12 and the base casing 16 are rectangular in shape and have vents 20 (hidden in the base). A temperature gauge 22 is positioned on a front face of the lid casing 12 for measuring the temperature during a baking or closed oven process. Sixteen fasteners 24 with eight on each casing and separated in pairs hold inside fasteners or rods 26 for holding trays or pans 28 and grills or grids 30 at two different levels. The base casing 16 has handles 32 on each side for convenient carrying of the barbecue grill 10. A propane tank 34 with a flexible gas line 36 and a T-connector 38 supplies the heating gas to gas valves 40 outside and the burners 42 (FIGS. 2–6 and 9) inside the lid casing 12 and the base casing 16.

Figure 2:
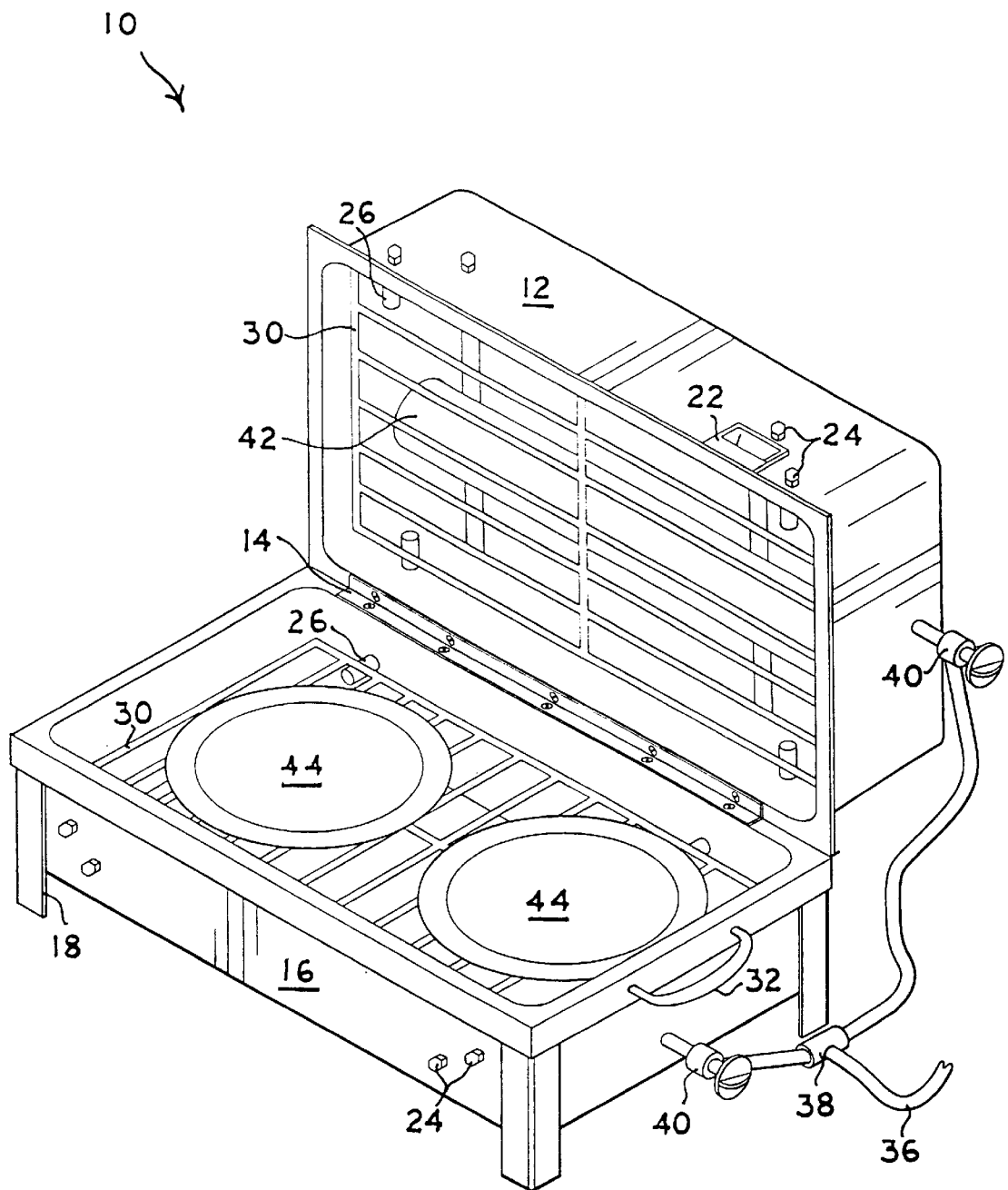
FIG. 2 is a perspective view of the FIG. 1 embodiment for oven baking of two pies on the base with the lid in an open normal, i.e., at a 90°, position.

In FIG. 2, two pies 44 are being baked on the grill or grid 30 with the barbecue grill 10 purposely depicted open prior to closure and use as an oven.

Figure 3:
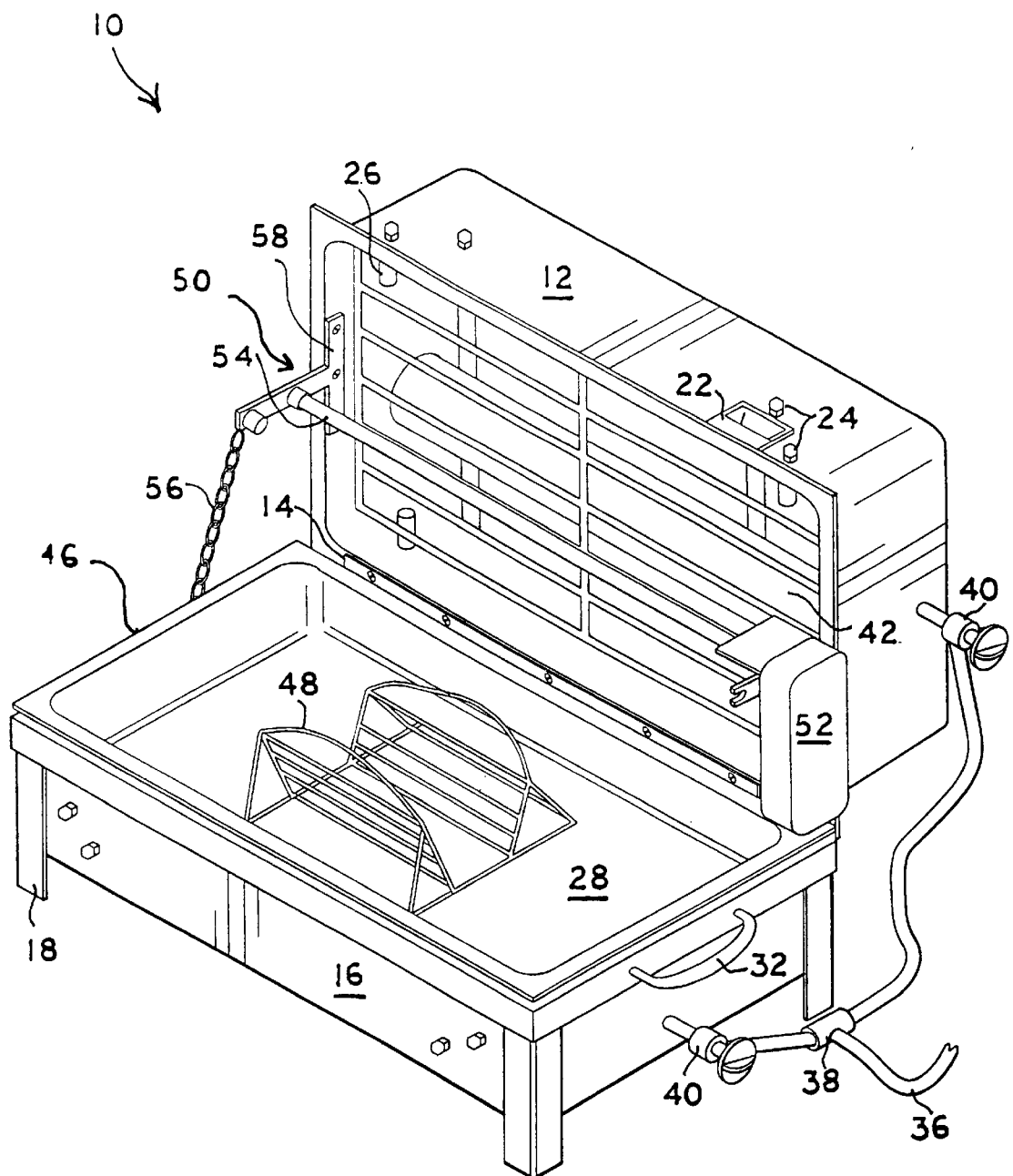
FIG. 3 is a perspective view of the FIG. 1 embodiment for a combination pan cooking or open roasting of meat on a rack on the base and utilizing the rotisserie or spit of the lid in an open normal position.

In FIG. 3, a close fitting rectangular tray or pan 28 with its edges 46 resting on the perimeter of the base casing 16 can pan cook food or further support a rack 48 for roasting meat. The lid casing 12 now supports a rotisserie unit 50 having an electric motor 52 and a spit rod 54. The electricity can be supplied from a remote outlet or from a vehicle's battery. The lid casing 12 is supported perpendicularly to the base casing 16 by a chain lock 56 attached to a pair of T-shaped rotisserie brackets 58 at one end and the opposite end to the base casing 16. Roasting on a pan 28 with a rack 48 and by using a rotisserie 50 are simultaneous cooking functions shown in FIG. 3.

Figure 4:
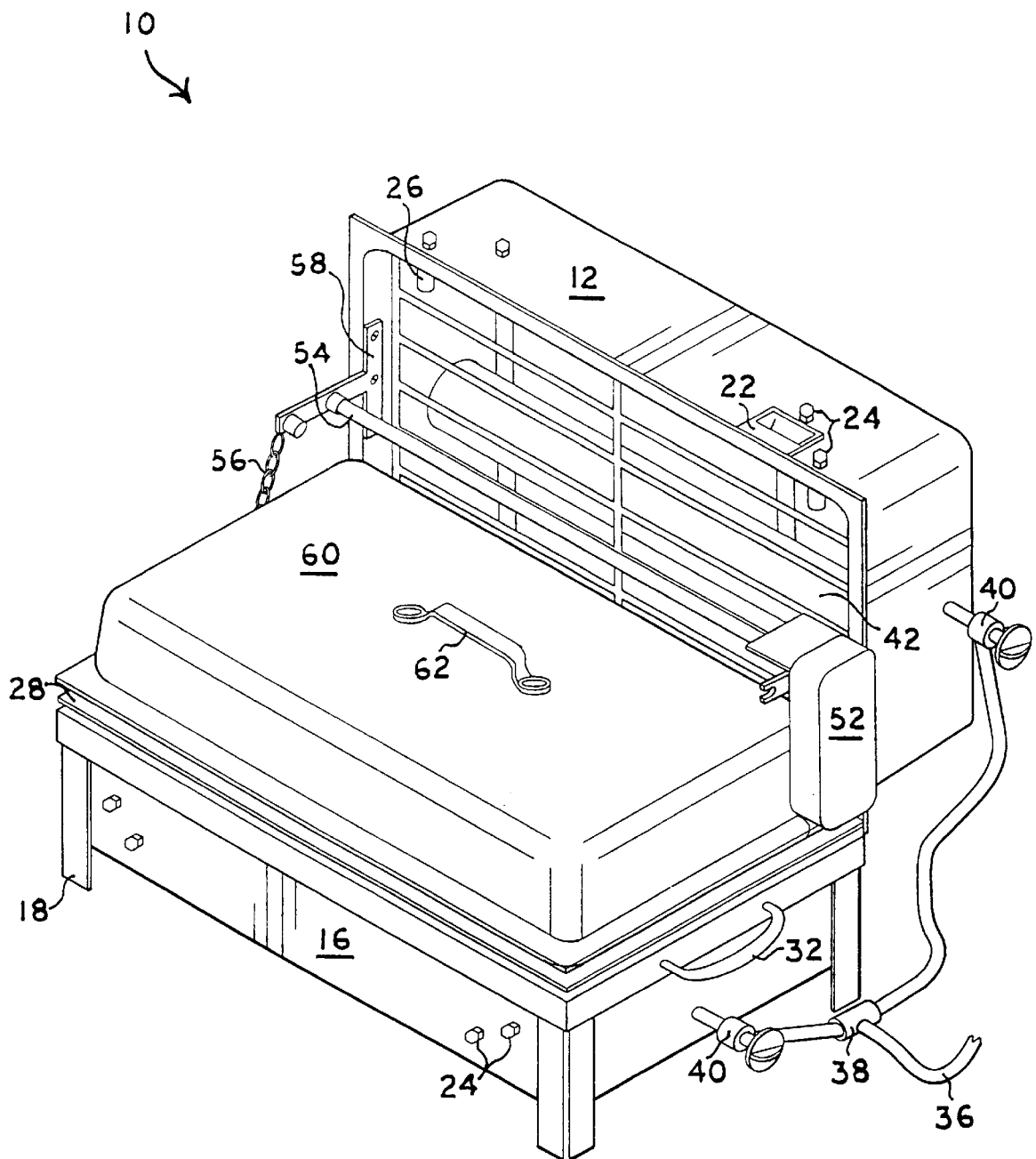
FIG. 4 is a perspective view of the FIG. 1 embodiment utilizing only the base for baking with an additional baking cover and the lid in an open normal position.

In FIG. 4, a cover 60 with a handle 62 is added to cover food in the pan 28 for baking, boiling or broiling with the lid casing 12 positioned normal to the base casing 16.

Figure 5:
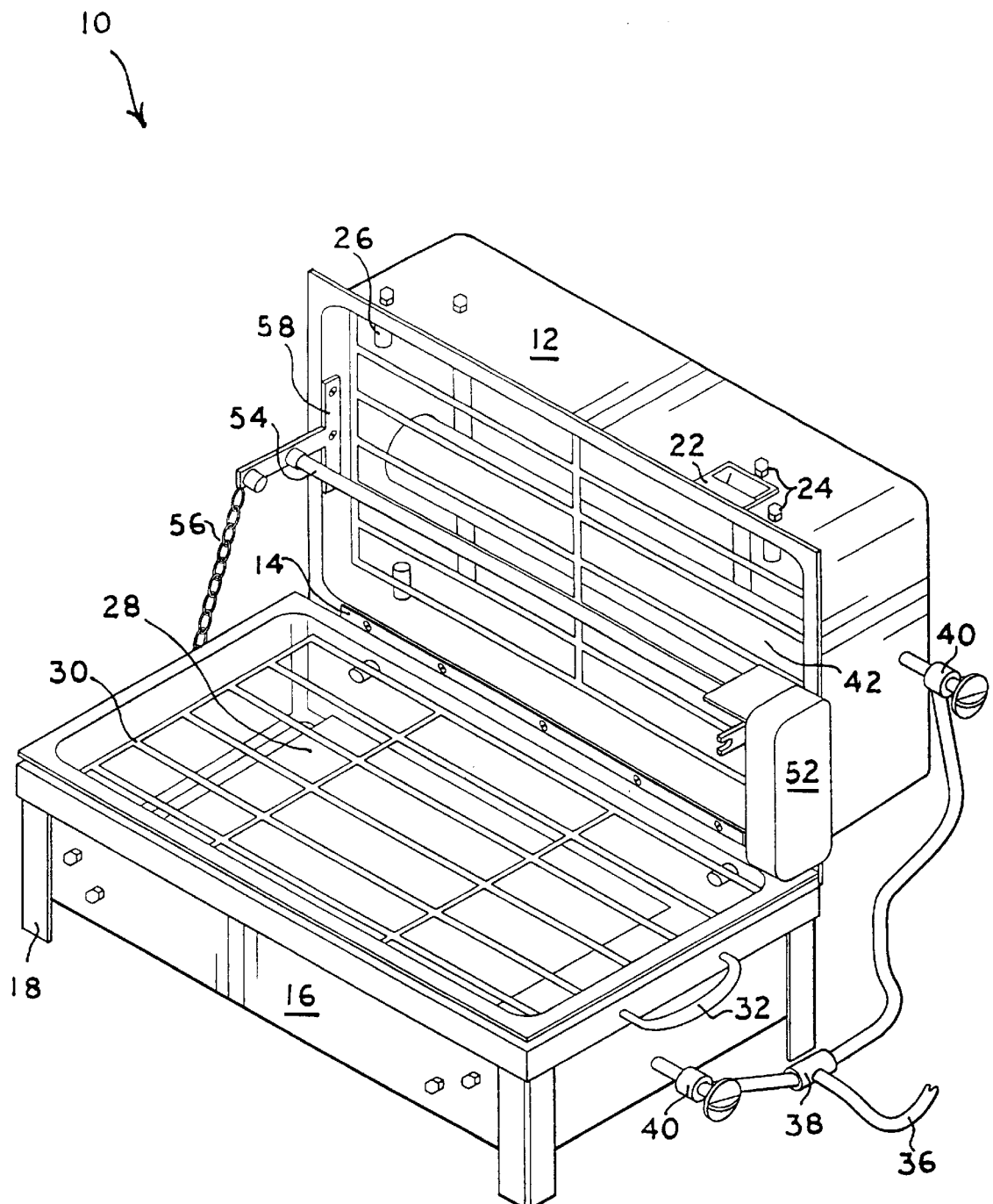
FIG. 5 is a perspective view of the FIG. 1 embodiment utilizing the base for barbecuing steaks on a grill and cooking meat on a rotisserie or spit.

As shown in FIG. 5, cooking with the rotisserie unit 50 and barbecuing of food on the grill or grid 30 can be simultaneously conducted to save time. A flat diffusing pan 28 is used under the grill or grid 30.

Figure 6:
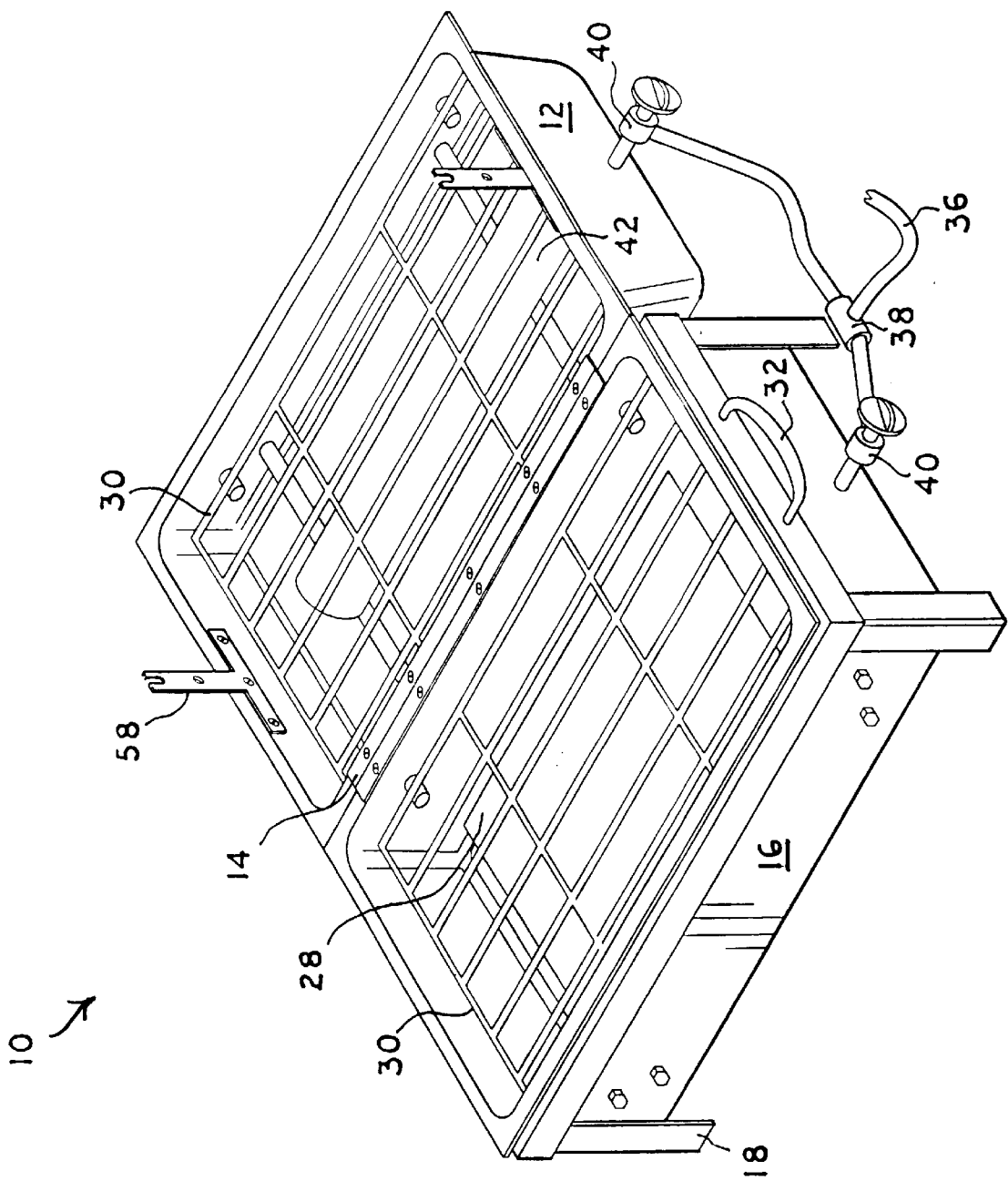
FIG. 6 is a perspective view of the FIG. 1 embodiment with the base and lid horizontal for barbecuing on both sides over a grill.

In FIG. 6, the lid casing 12 and the base casing 16 are arranged horizontally as the hinge 14 holds the casings in this position by opening only 180°. Now both casings can support grills or grids 30 for simultaneous barbecuing or supporting of other pots and pans for cooking food.

Figure 7:
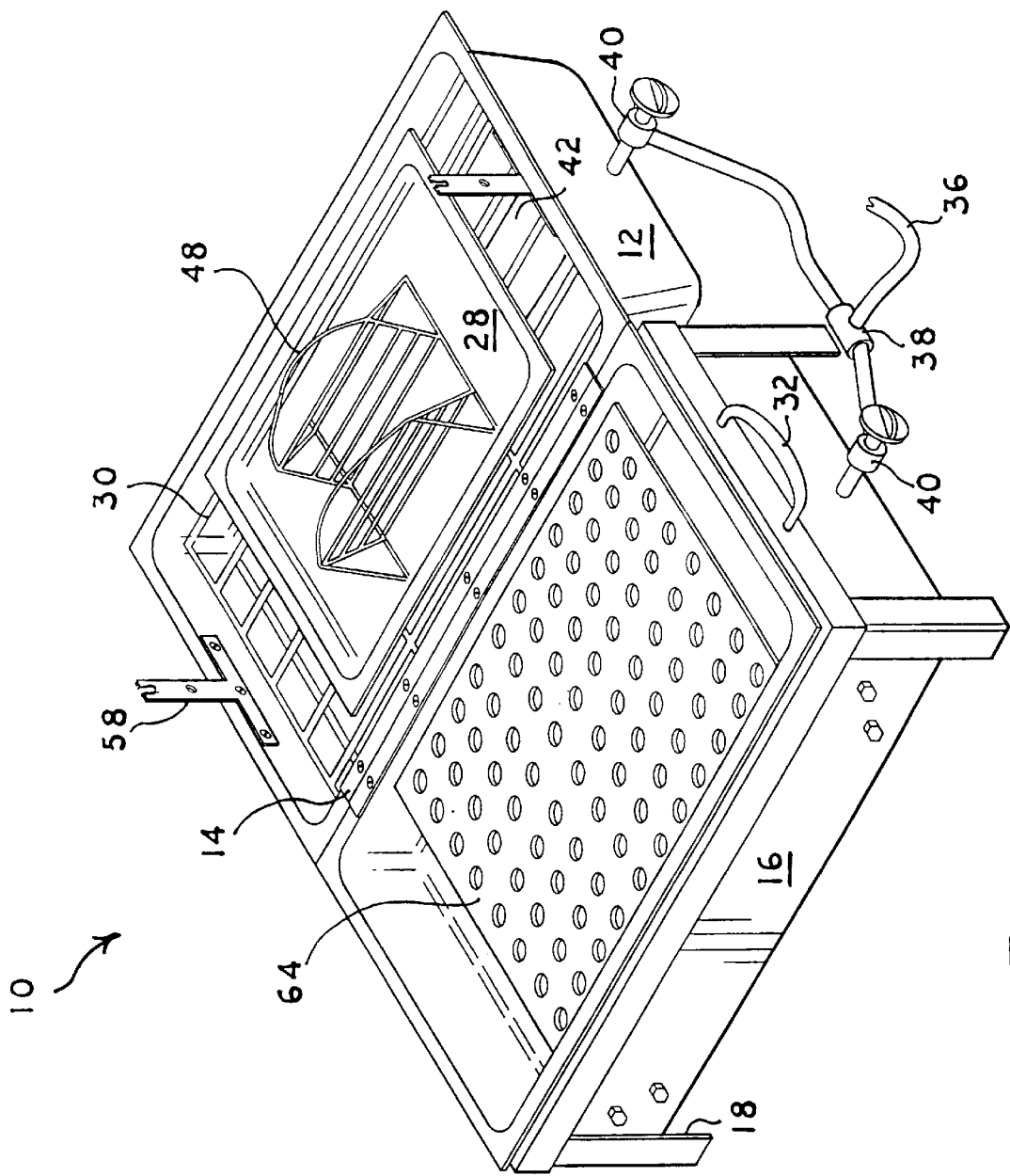
FIG. 7 is a perspective view of the FIG. 1 embodiment with a seafood pan in the base and a broiler pan and rack on the lid.
Figure 8:
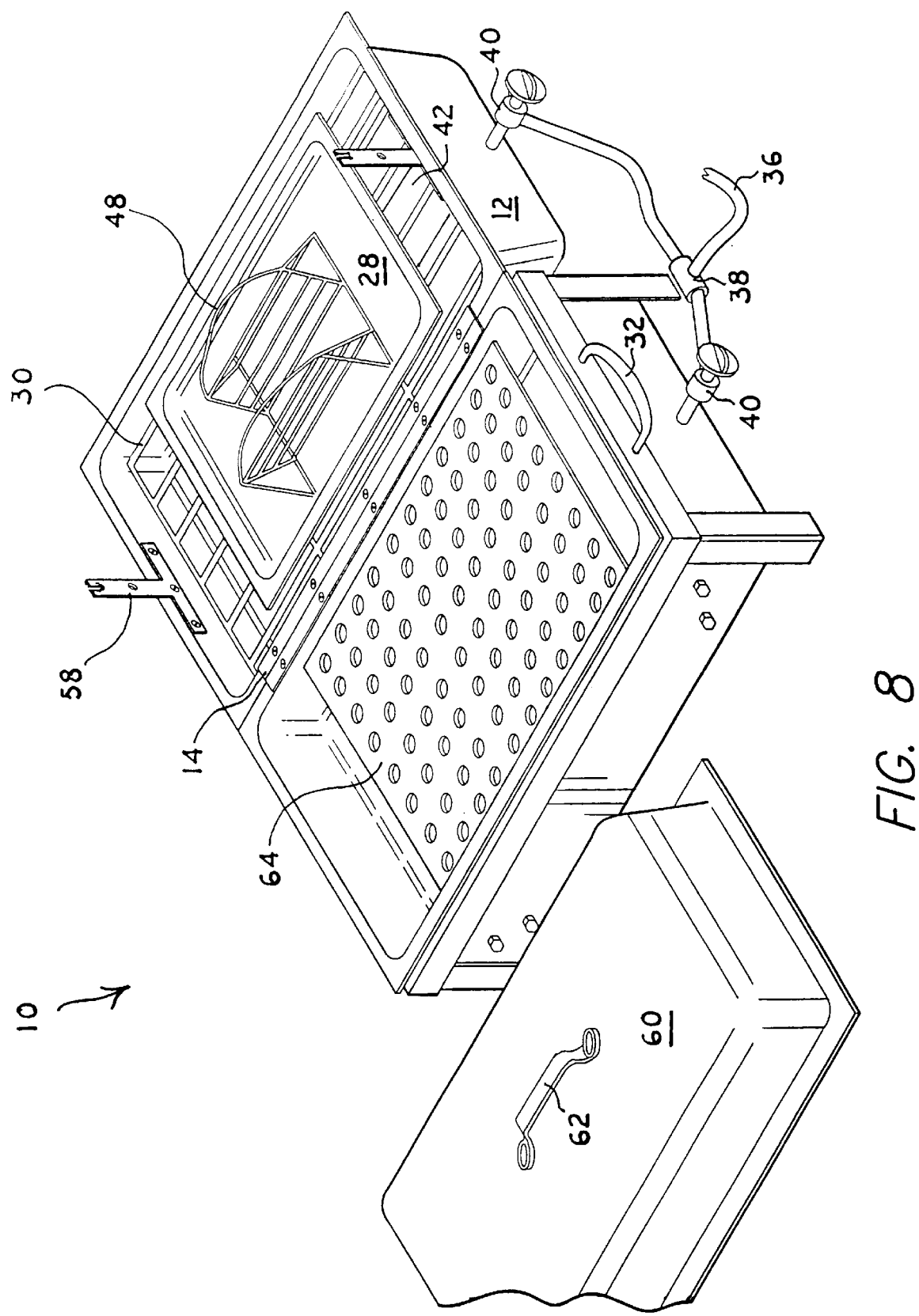
FIG. 8 is a perspective view of the FIGS. 1 and 7 embodiment with a cover for either the lid or the base.

In FIGS. 7 and 8, a perforated metal pan 64 for cooking fish is positioned on the base casing 16 and a roasting rack 48 on a pan 28 is positioned on the horizontally arranged lid casing 12 for performing two cooking functions simultaneously with heating fuel from one propane tank. In FIG. 8, broiling can be performed on the base casing 16 by covering with a cover 60.

Figure 9:
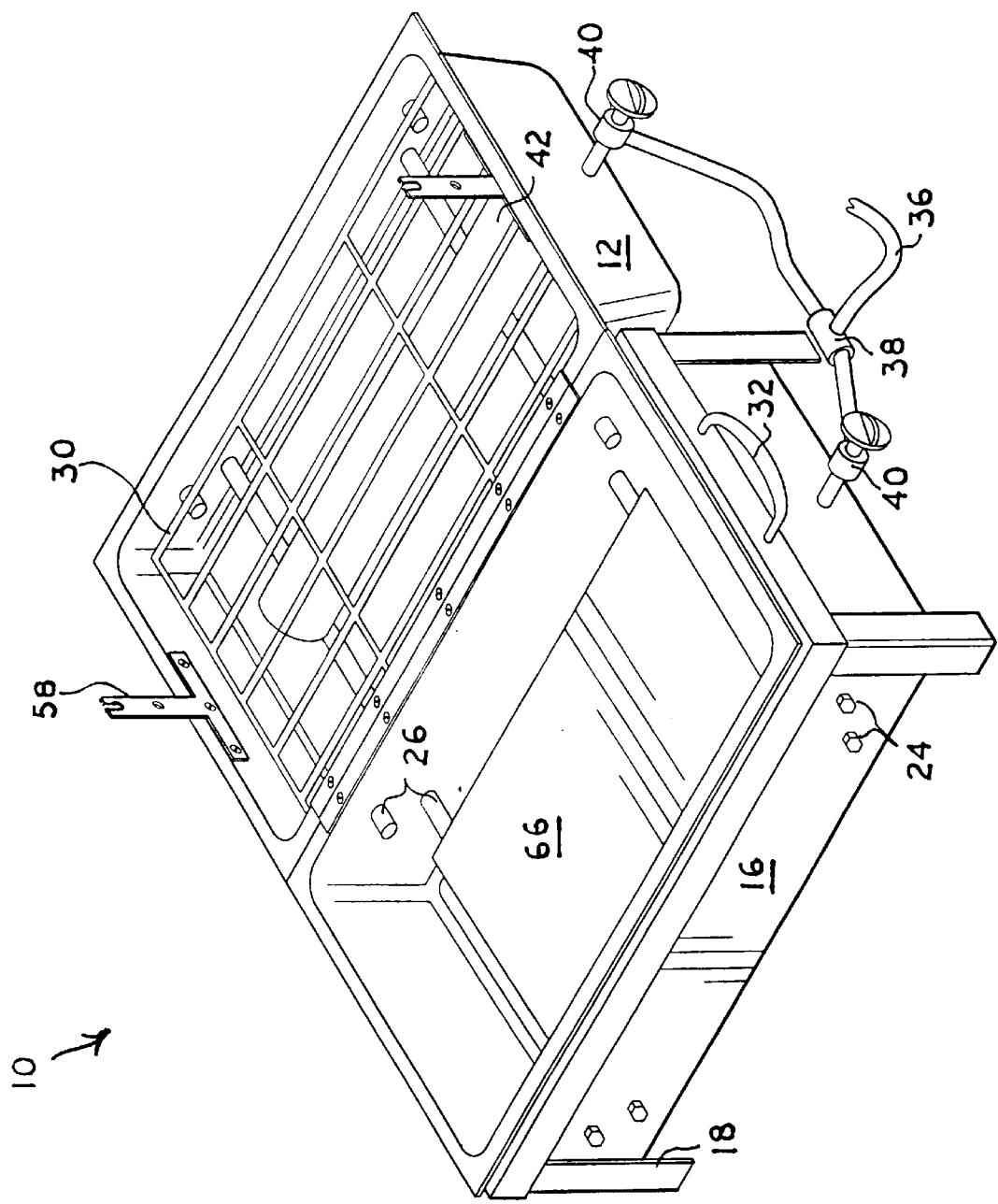
FIG. 9 is a perspective view of the FIG. 1 embodiment with a porcelain covered metal sheet in the base for cooking.

In FIG. 9, a porcelain covered metal sheet 66 is placed on the lower set of four inside fasteners 26 for warming food in the base casing 16. The lid casing 12 contains a grill or grid 30 for barbecuing, toasting and the like. For example, other cooking functions such as cooking food in a water containing pot or heating water for tea or coffee can be performed on the grill or grid 30.

Figure 10:
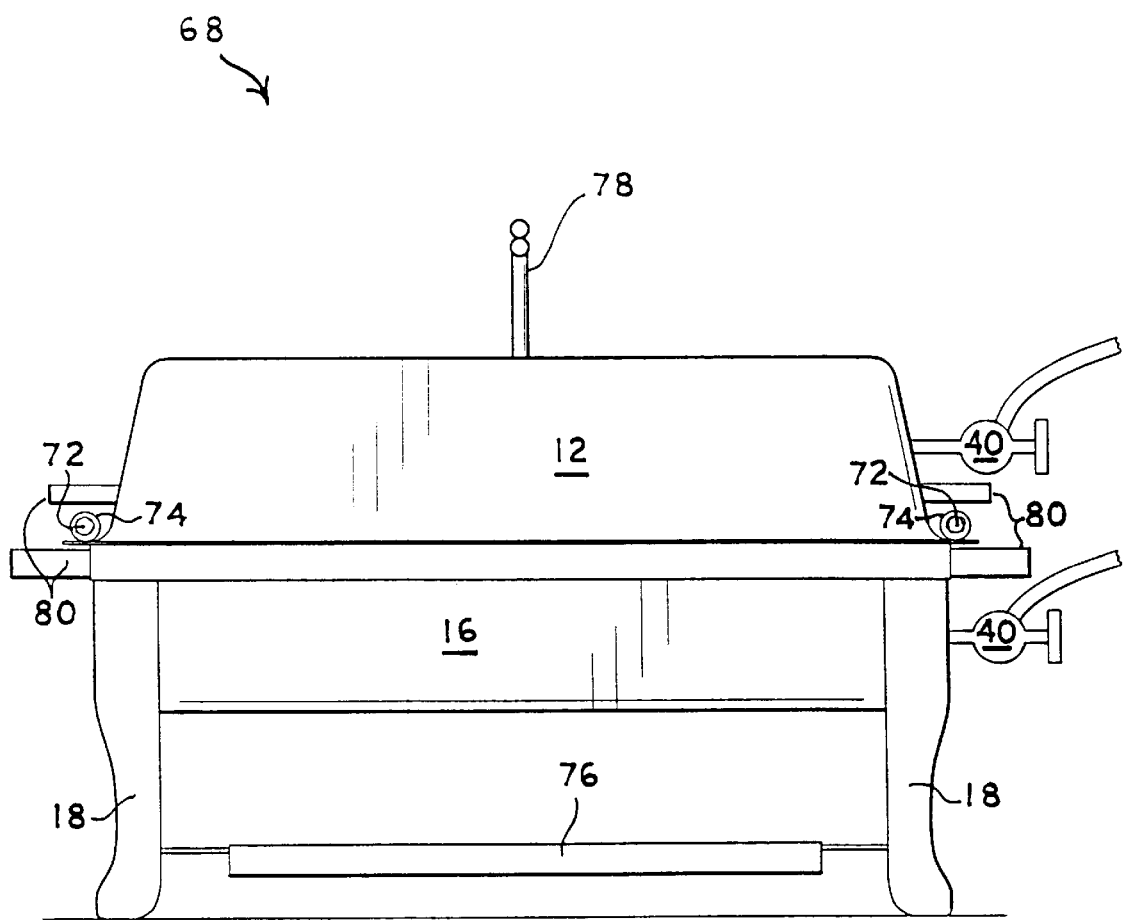
FIG. 10 is a front elevational view of a second embodiment of a barbecue apparatus with a pair of side tubes in a closed position without the attached propane tanks.
Figure 11:
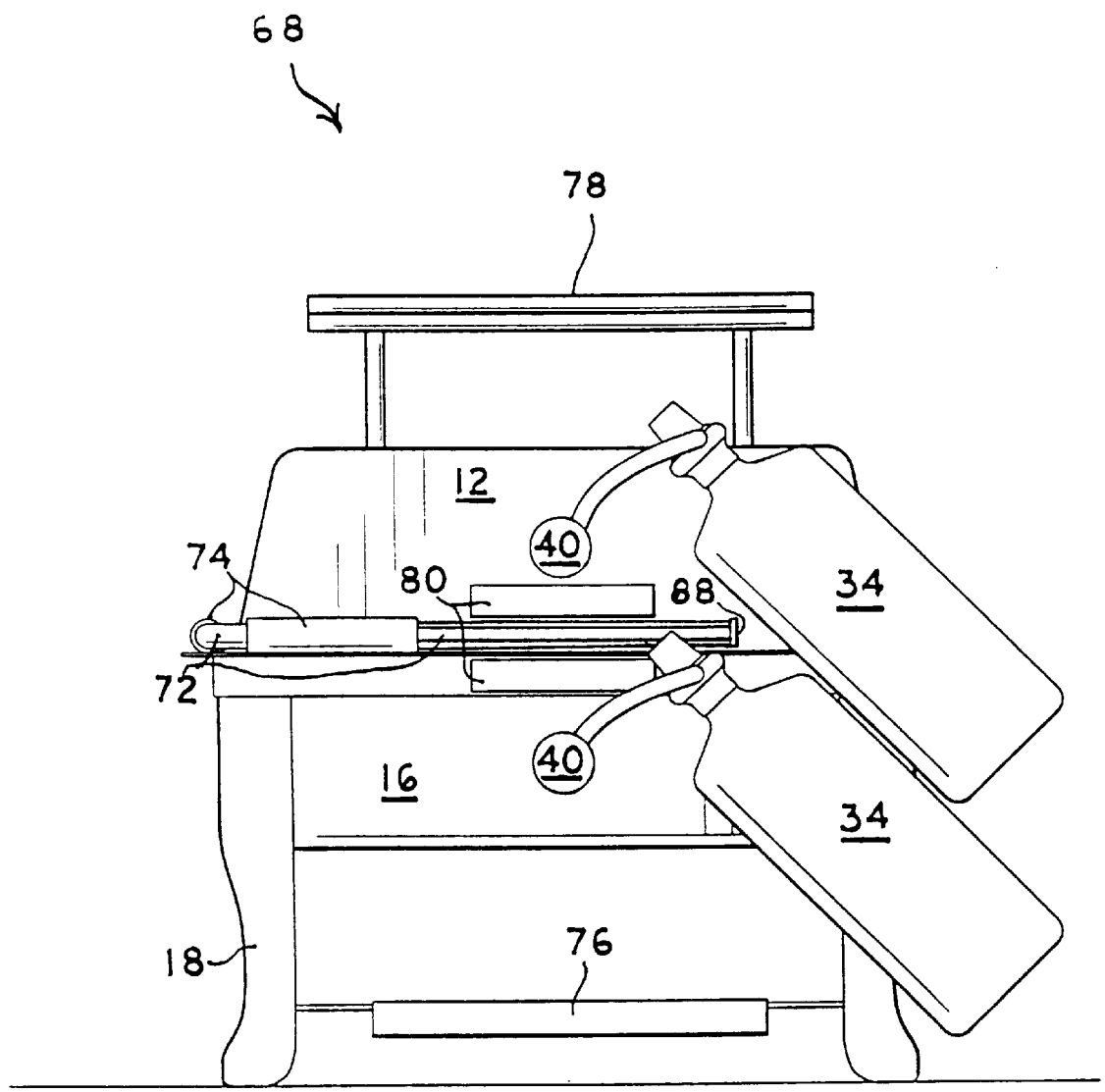
FIG. 11 is a right side elevational view of the FIG. 10 embodiment with individual propane tanks.
Figure 12:
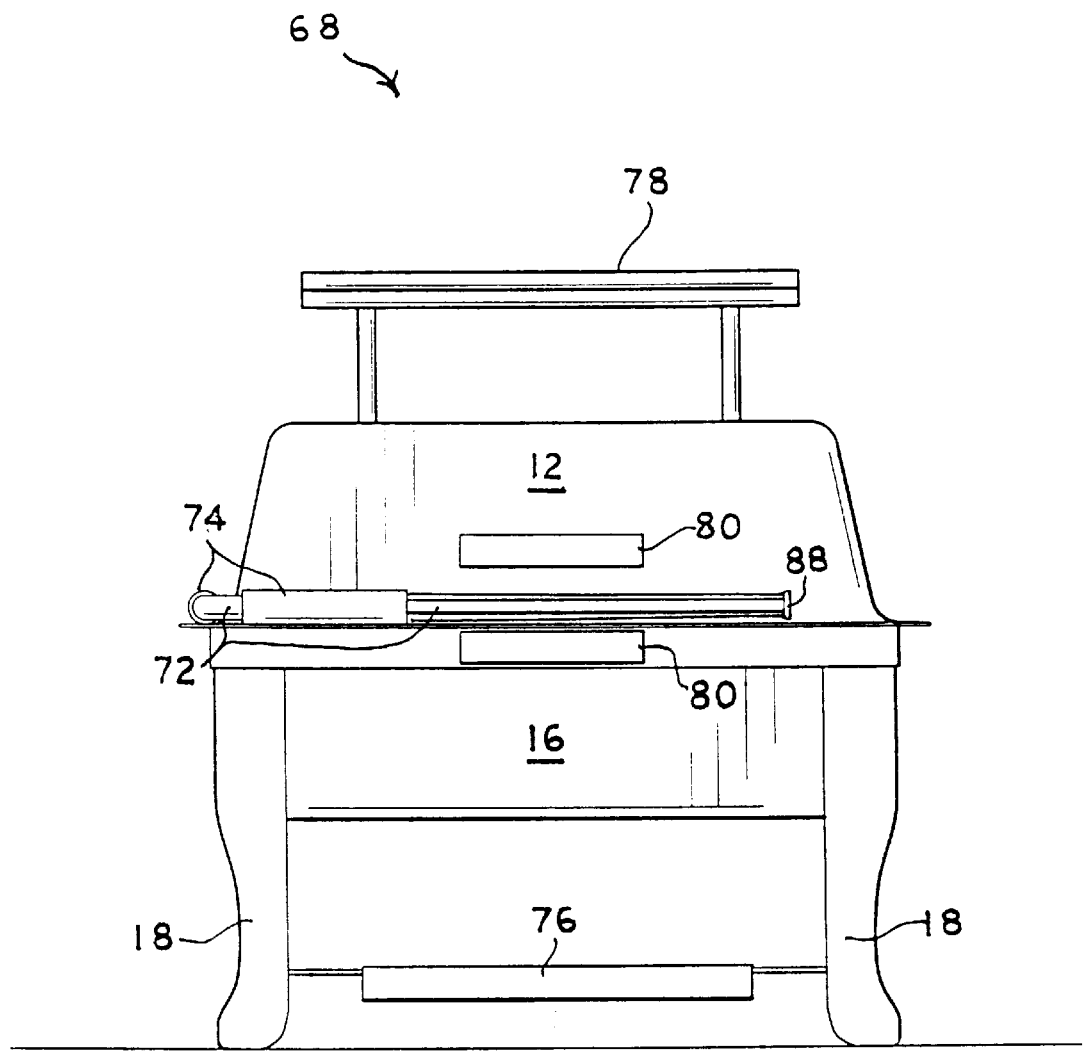
FIG. 12 is a left side elevational view of the FIG. 10 embodiment without showing the gas tanks.

Turning to the second embodiment of a barbecue grill apparatus 68 illustrated in FIGS. 10 to 17, the modifications include separate gas tanks 34, a pair of hinged apertured plates 82, a U-shaped extendable hinge 72 operating within three hinge tubes 74, a grease catching tray 76 below the base casing 16, and a handle-support 78 on the lid casing. FIGS. 10 to 12 depict the closed apparatus 68 from several sides. Side handles 80 are positioned on either side of the lid casing 12 and the base casing 16. The apparatus 68 when closed can be operated as an oven utilizing the temperature gauge 22 on the front of the lid casing 12 for maintaining the desired baking or broiling temperature.

Figure 13:
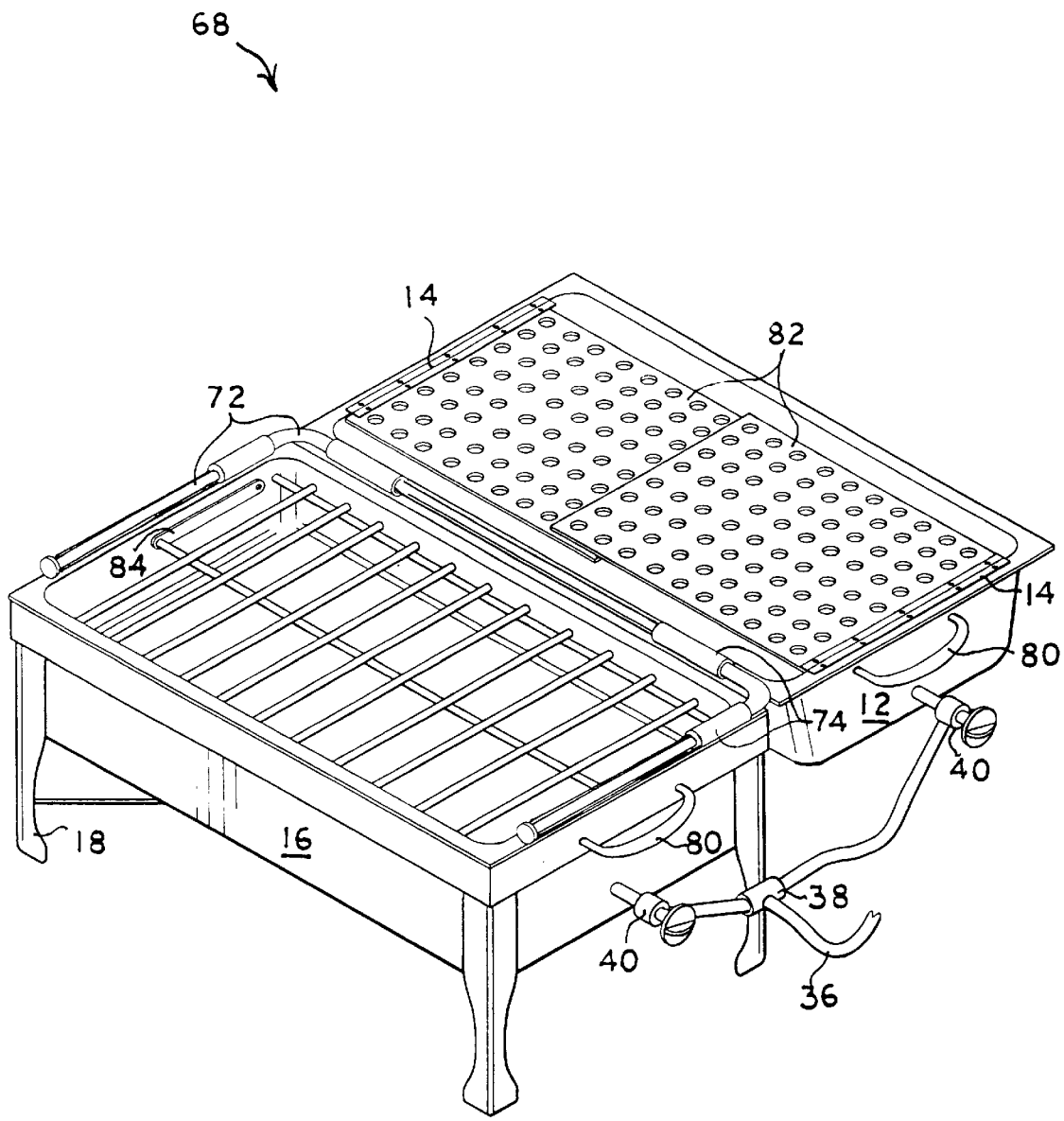
FIG. 13 is a perspective view of the FIG. 10 embodiment with the apparatus fully open for cooking seafood on a grill over the base and on a pair of apertured plates over the lid with a connection to a single propane tank.

In FIG. 13, the barbecue grill 68 is opened fully to rest the lid casing 12 on a surface supported by the top handle 78 (hidden). A pair of slightly overlapping apertured side plates 82 are fastened to the sides of the lid casing 12 by hinges 14 coextensive in length. In this position, the side plates 82 can be used to cook lightweight seafood such as shrimps and fish. The other grill can be simultaneously used for barbecuing hamburger patties 104 (FIG. 19) or the like with the grease catching tray 76 collecting the fatty drippings.

Figure 14:
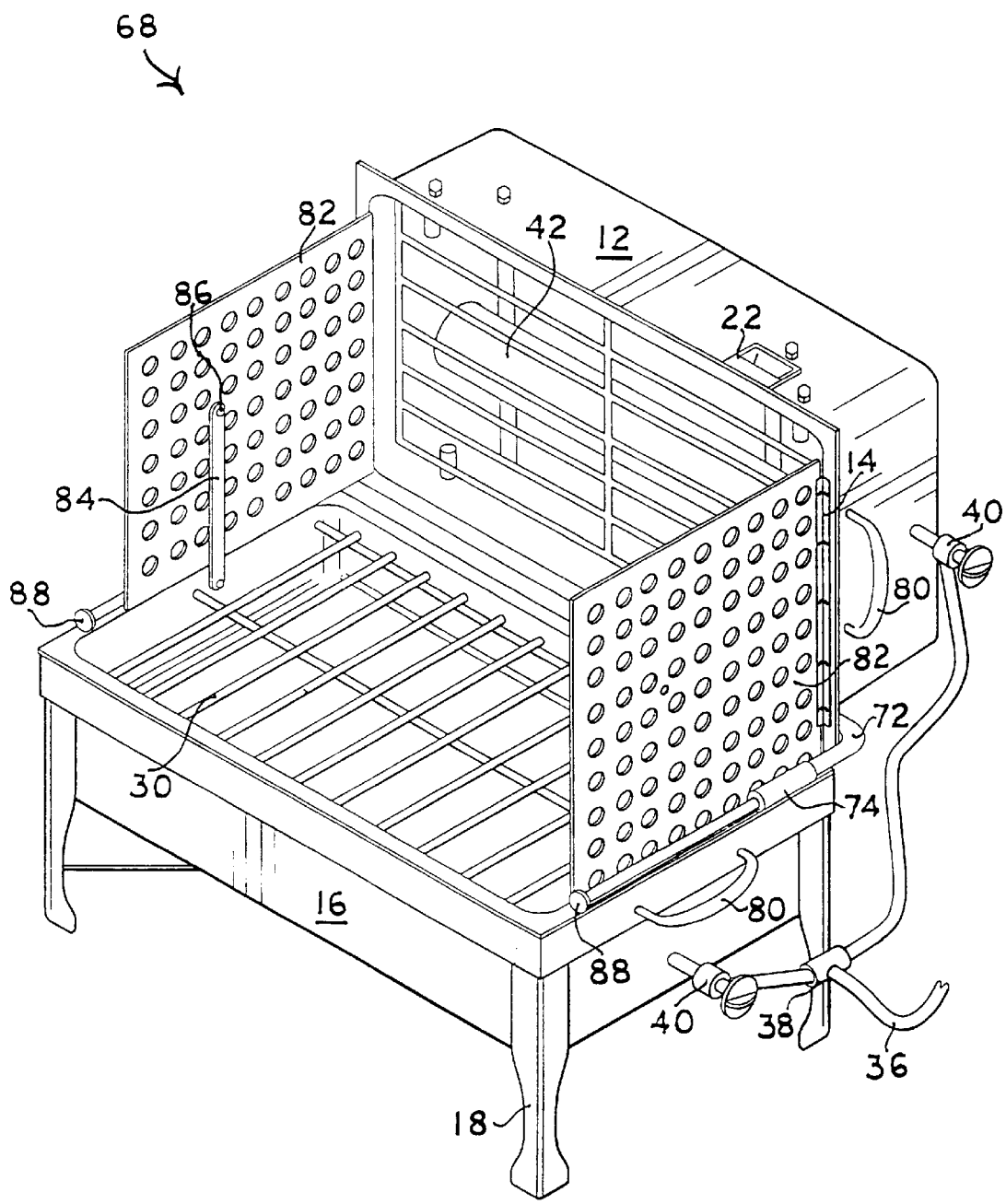
FIG. 14 is a front perspective view of the FIG. 10 embodiment with the apparatus in a normal (90°) configuration with the apertured plates extended over the sides of the base.

FIG. 14 illustrates the normal or 90° position of the lid casing 12 with the perforated side plates 82 extended and held in place by pivotable plate holder straps 84 and fasteners 86. The extended side plates 82 can function as wind barriers and support the lid casing 12 in the normal position. Food can be cooked on the grill 30 of the base casing 16, per se, or in a pan.

Figure 15:
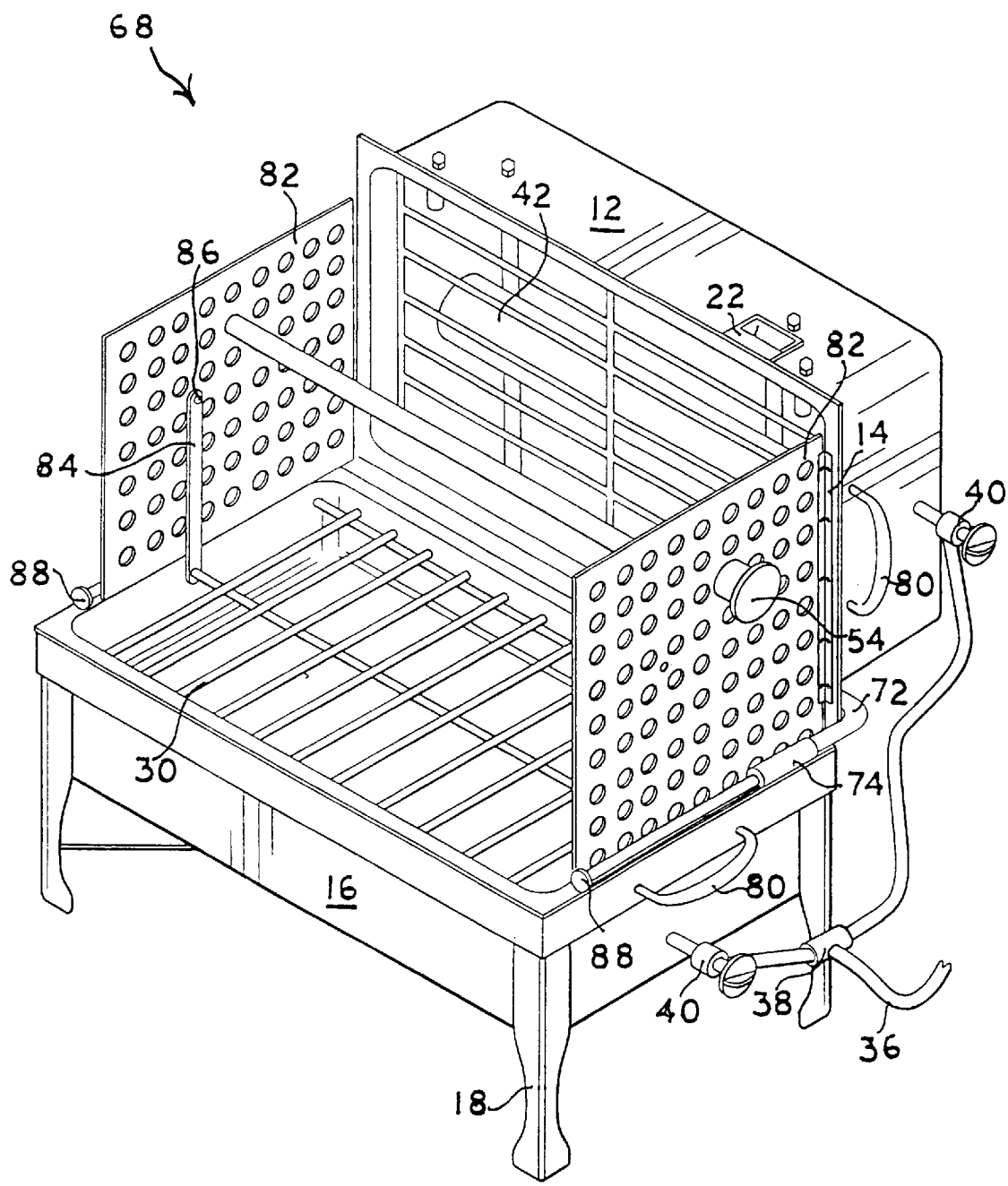
FIG. 15 is a front perspective view of the FIG. 10 embodiment with modification of the FIG. 14 apparatus to include a rotisserie.

FIG. 15 depicts the addition of a spit rod 54 between the perforated side plates 82 and the attached food rotated manually.

Figure 16:
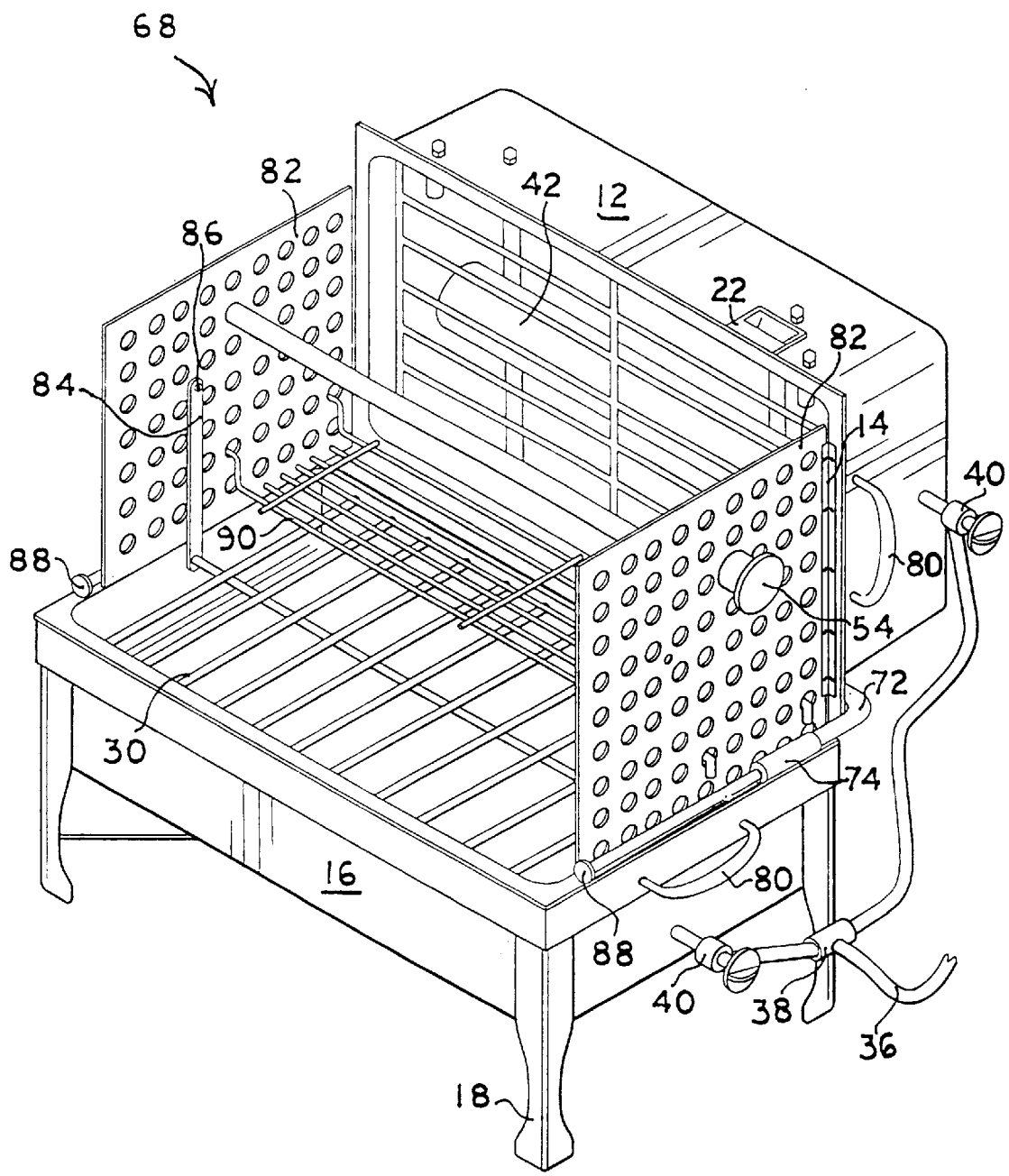
FIG. 16 is a front perspective view of the FIG. 10 embodiment with modification of the FIG. 15 apparatus to include an extension grill.
Figure 17:
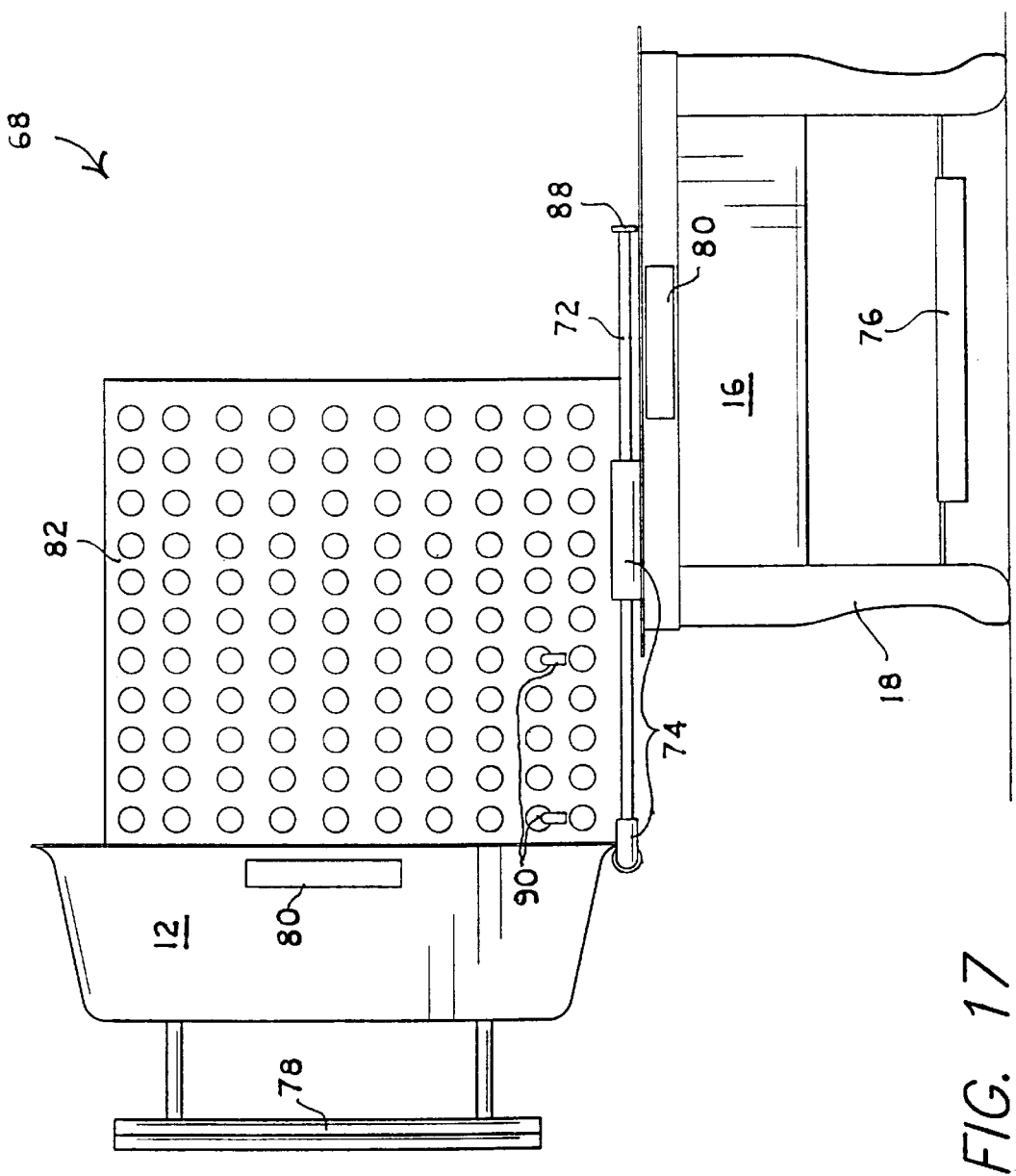
FIG. 17 is a left side elevational view of the FIG. 10 embodiment with extension of the lid rearward along with the apertured side plates.

FIGS. 16 and 17 show the barbecue grill 68 with the lid casing 12 extended rearward at least 6 inches from the base casing 16. The knobs 88 on the ends of the extendable hinge rods 72 thus limit the extension of the hinge rods in the hinge tubes 74. FIG. 16 illustrates the addition of a narrow rack 90 suspended above the grill 30 of the base casing 16 between the side plates 82 prior to the extended stage shown in FIG. 17. The rack 90 can be located below the cooking food on the spit rod 54 by moving in depth, i.e., forward and rearward, to catch the drippings by supporting a makeshift aluminum tin foil pan (not shown). The rack 90 can be raised higher between the side plates 82 to heat buns, whole potatoes and the like food.

Figure 18:
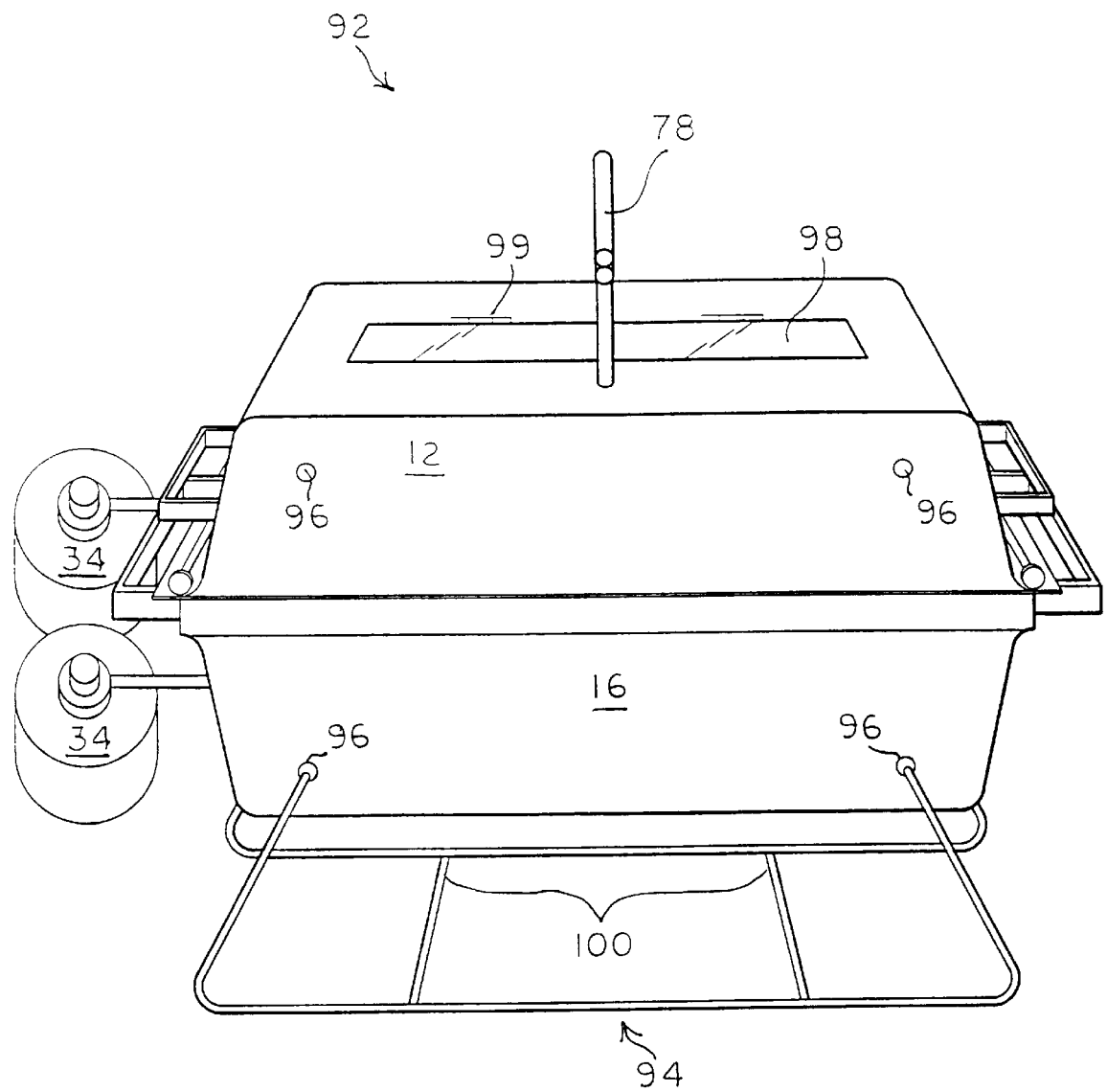
FIG. 18 is a front perspective view of a third embodiment of a closed barbecue grill having a hinged transparent venting flap for the lid casing, a combination wire leg support and a tray holder.
Figure 19:
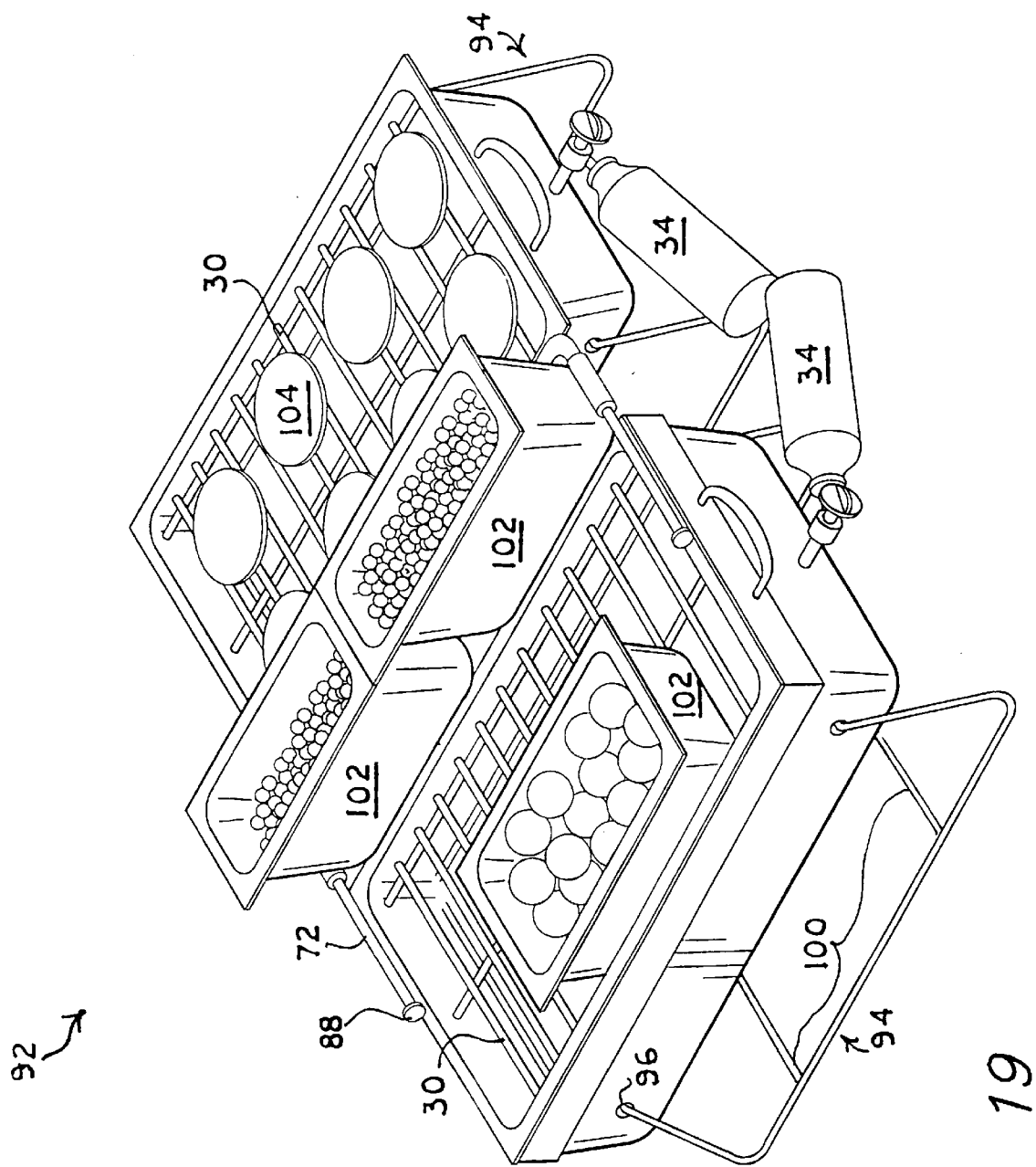
FIG. 19 is an environmental top perspective view of the FIG. 18 embodiment with food on the grill and food trays stored between the extended lid casing and the base casing.

FIGS. 18 and 19 illustrate a third embodiment 92 which is a modification of the second embodiment 68. A transparent colored venting flap 98 having two hinges 99 is added to the lid casing 12 in FIG. 18. A pair of wire leg supports 94 can be utilized for supporting the lid casing 12 and the base casing 16 as depicted in FIG. 19. Apertures 96 are formed in pairs on both sides (length) of the lid casing 12 and the base casing 16 for attaching the leg supports 94. The base casing 16 has the usual rectangular vents 20 (hidden).

The wire support 94 has several crossbars 100 to afford another advantage in supporting food pans or trays 102 or the conventional long handled barbecue implements used in cooking such as spatulas, forks, tongs, basting brush, and the like.

FIG. 19 illustrates another advantage of the second and third embodiments when the lid casing 12 and the base casing 16 are horizontally aligned and spaced due to the extended hinge rod 72. Two six-inch wide rectangular pans 102 can be conveniently placed in the space. Hamburger patties 104 can be grilled on the base casing 16 while a pan of food can be cooked or warmed on the lid casing 12.

Figure 20:
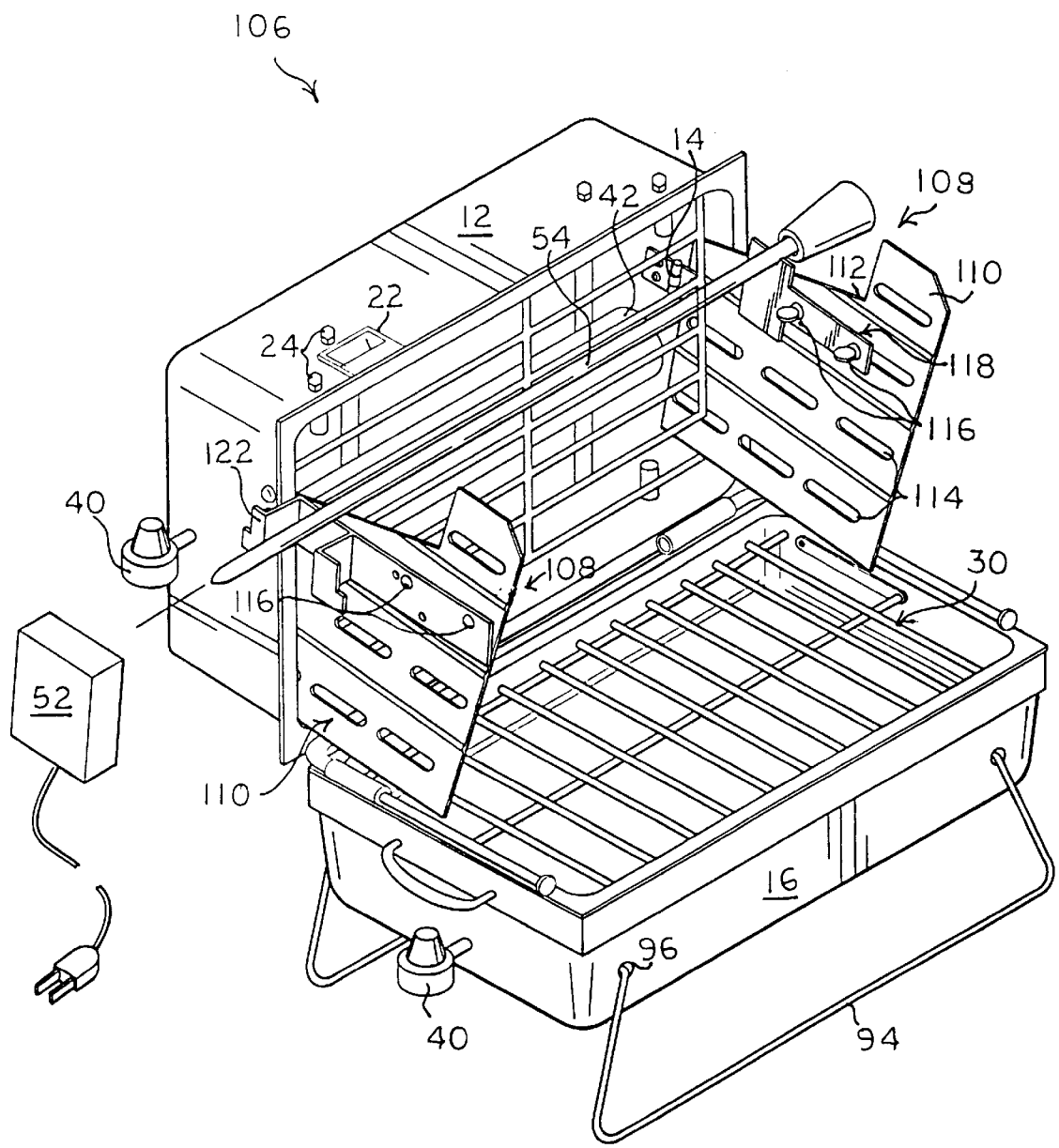
FIG. 20 is a perspective view of detachable pit holder wing plates having horizontal slots mounted in the lid casing for adjusting the distance of the spit from the burner in the lid casing.
Figure 21:
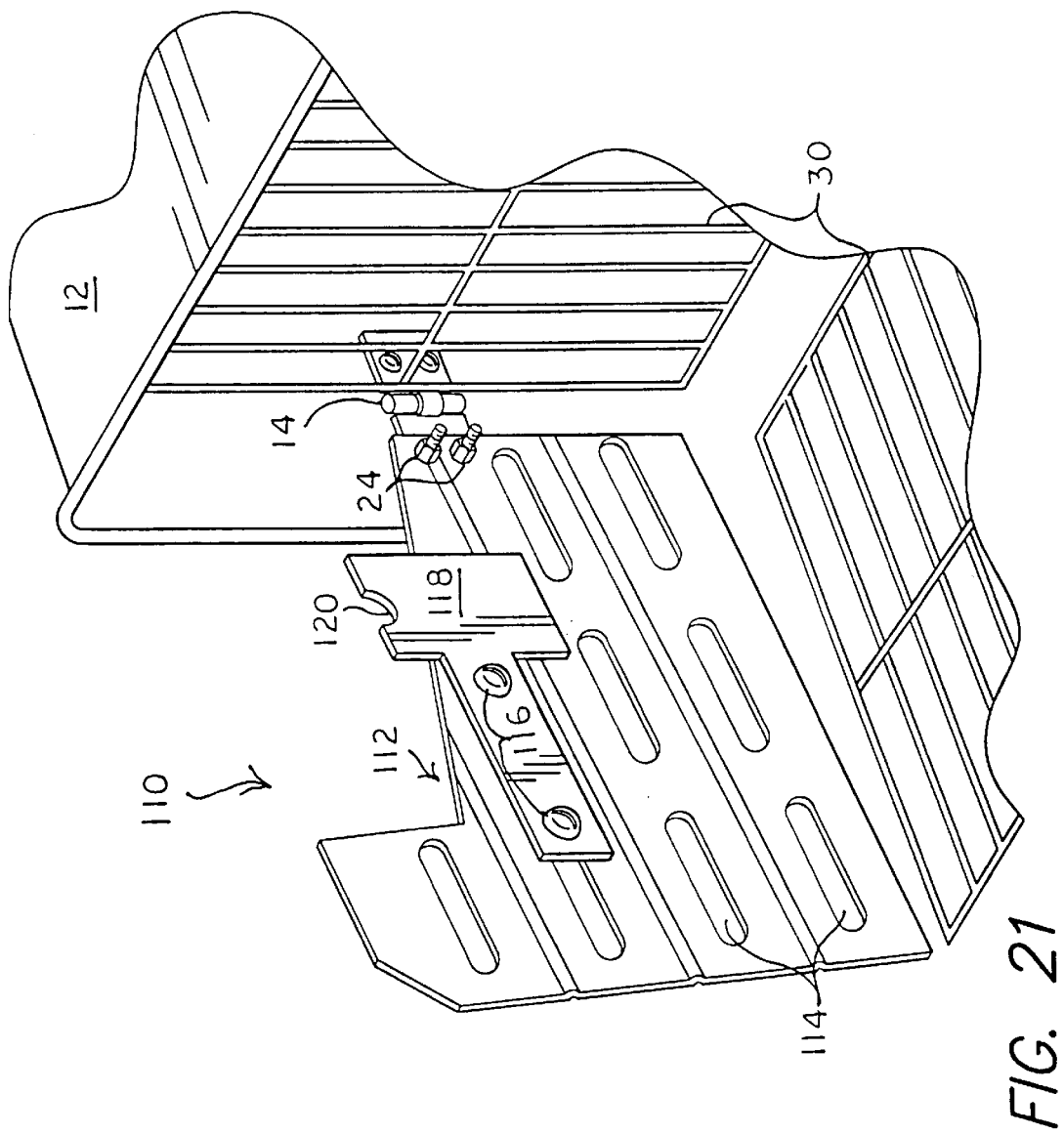
FIG. 21 is an enlarged perspective view of a slideable pit holder mounted in a slot of a wing plate for holding the end of a revolving spit rod.
Figure 22:
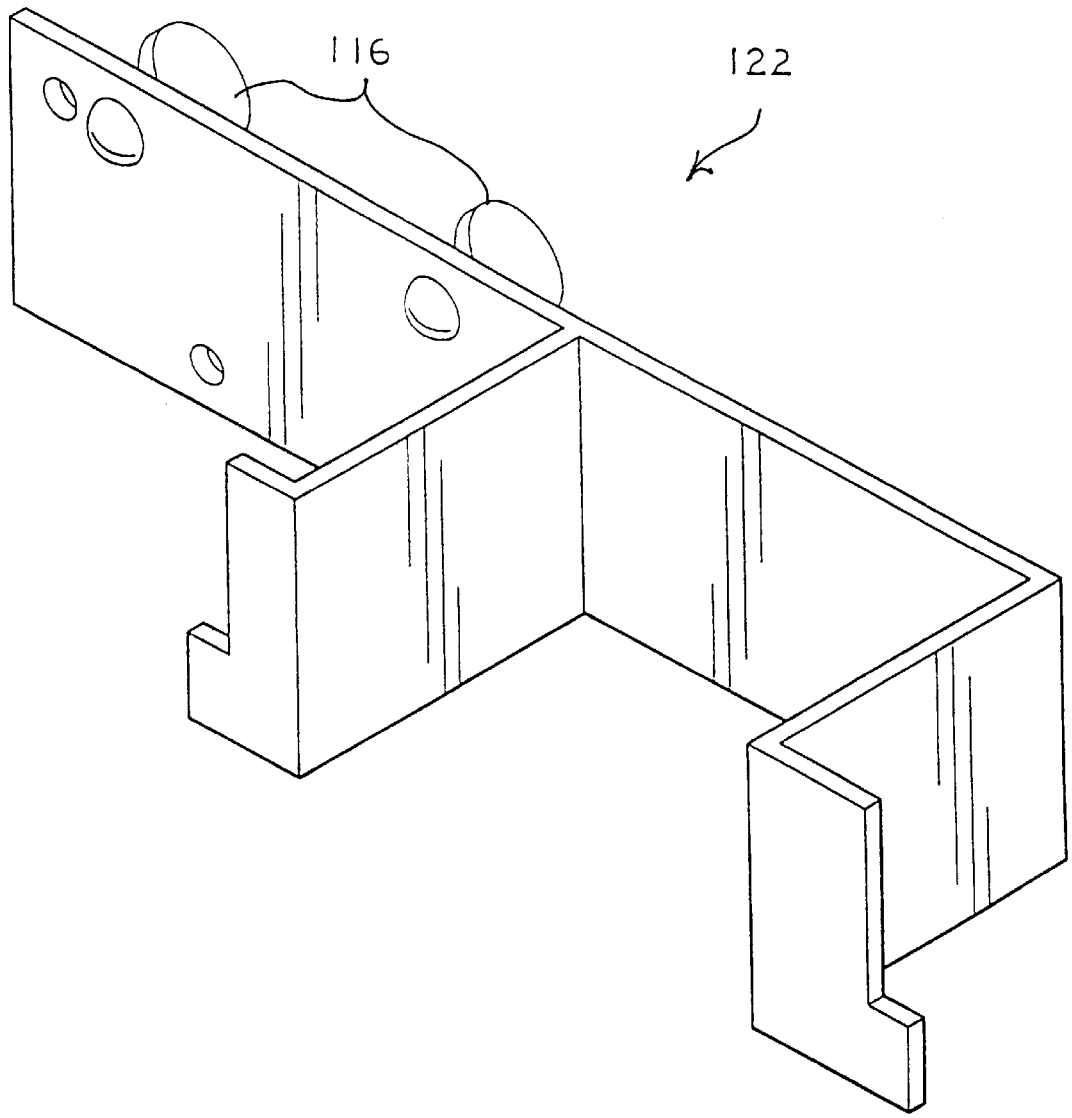
FIG. 22 is an enlarged perspective view of a slideable motor mount device to be mounted in a slot of an opposing wing plate.
Figure 23:
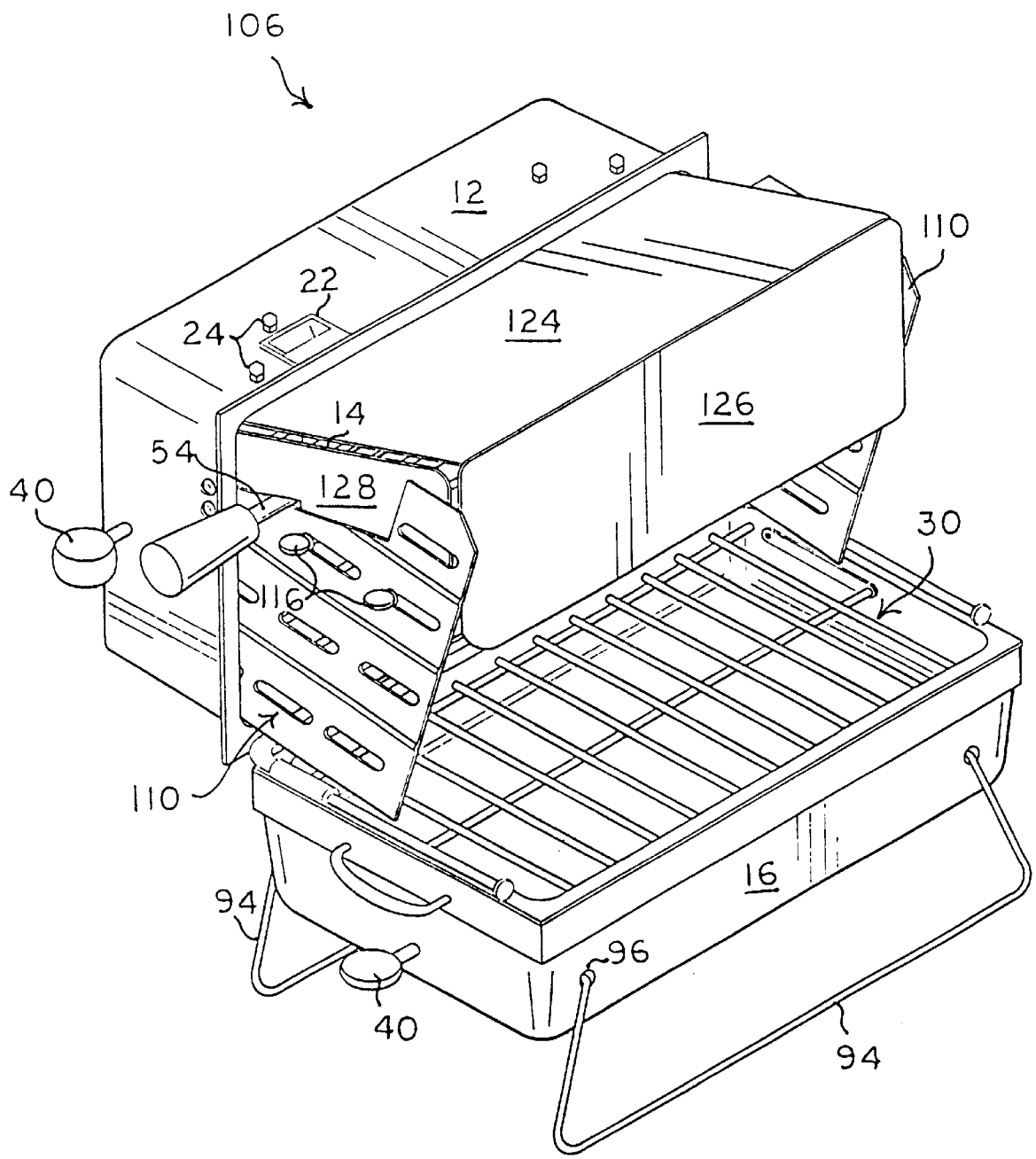
FIG. 23 is a perspective view of a heat retainer shield mounted over the spit.
Figure 24:
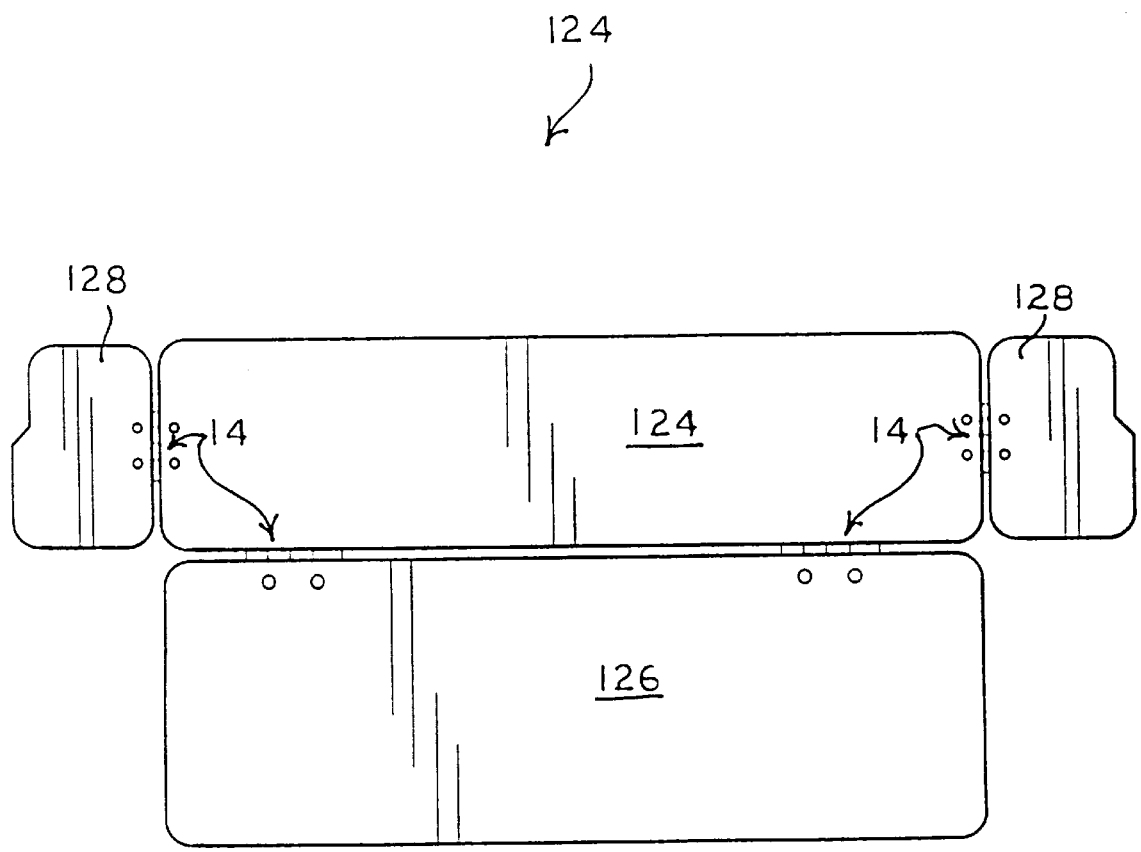
FIG. 24 is a top plan view of the heat retainer shield flattened.

A fourth embodiment 106 is illustrated in FIGS. 20–24, wherein an adjustable spit holder 108 is shown to permit adjustable spacing of the spit rod 54 from the burner 42 in the lid casing 12 due to the size of the rotating food. In FIGS. 20 and 23, a pair of asymmetrical flat wing plates 110 with each having an inclined notch 112 on top and an array of horizontal slots 114 are attached to the sides of the lid casing 12. FIG. 21 shows a T-shaped spit end holder 118 with a notch 120 attached by fasteners 116 such as thumbscrews to a pair of adjoining slots 114. FIGS. 20 and 22 show a bracket 122 for securing the electric rotisserie motor 52 to the outside surface of the opposite wing plate 110 by fasteners 116. FIGS. 23 and 24 illustrate a metal heat retainer 124 comprising four parts connected by hinges 14 for positioning over the rotating food. A long rectangular top plate 126 has two notched side plates 128 which are tucked into the lid casing 12 and rest on the spit rod 54. The long rectangular front plate 126 is lowered in front of the rotating food. This heat retainer 118 acts to improve and shorten the cooking process by radiating the generated heat back onto the rotating food.

These barbecue units can be conveniently placed on the ground, on a picnic table and on the bed of an open bed truck for tailgate parties. The advantage of performing simultaneous cooking functions on these barbecue units would greatly hasten the food preparation time.

It is to be understood that the present invention is not limited to the sole embodiments described above, but encompasses any and all embodiments within the scope of the following claims.

I claim:

1. A portable multi-functional barbecue grill comprising:
    a rectangular base casing having an open top, a vented bottom and a supporting means on its bottom surface for elevating said base casing;

said base casing containing a removable rectangular grill and a burner grate for dispensing a heating source;

a rectangular lid casing having an external temperature gage, a deep well containing a removable rectangular grill and a burner means for dispensing a heating source;

a removable pan for both the base casing and the lid;

a removable rectangular perforated heating plate for positioning on the base casing;

a removable V-shaped roasting rack for positioning in the removable pan for both the base casing and the lid;

a rotisserie element attached to opposing sides of the lid;

a 90° and 180° opening hinge means connecting the lid to the base casing for positioning the lid normal or horizontal, respectively, to the base casing; and the lid and the base casing connected to a fuel source tank or each connected to separate fuel source tanks integrally attached;

whereby the multi-functional grill apparatus can barbecue, bake, pan broil, and roast food on a rotisserie.

2. The portable multi-functional barbecue grill apparatus according to claim 1, including a removable grease catching tray positioned below the base casing.

3. The portable multi-functional barbecue grill apparatus according to claim 1, including an extendable hinge means for positioning the lid rearward for accommodation of perforated side plates and operation of the rotisserie.

4. The portable multi-functional barbecue grill apparatus according to claim 3, including two rectangular food pans positionable in a space created between the base casing and the extended lid casing.

5. The portable multi-functional barbecue grill apparatus according to claim 3, including a narrow grid supported by and between the perforated side plates, and positionable at various heights and depths.

6. The portable multi-functional barbecue grill apparatus according to claim 1, wherein said supporting means are corner posts.

7. The portable multi-functional barbecue grill apparatus according to claim 1, wherein said supporting means comprises wire legs with a plurality of crossbars for supporting food trays and barbecuing implements.

8. The portable multi-functional barbecue grill apparatus according to claim 7, including a second set of wire legs with a plurality of crossbars for the lid casing.

9. The portable multi-functional barbecue grill apparatus according to claim 1, including vent holes or a rectangular flap in the top of the lid casing and vent holes in the bottom of the base casing.

10. The portable multi-functional barbecue grill apparatus according to claim 1, including a handle located on the lid casing of sufficient height to support the lid casing on a surface when the barbecue grill apparatus is fully opened to a horizontal position.

11. The portable multi-functional barbecue grill apparatus according to claim 1, including a pair of asymmetrical side plates having an array of internal slots and holders positioned on an upper inclined slot for positioning the spit from the lid casing according to the size of the food being rotated.

12. The portable multi-functional barbecue grill apparatus according to claim 11, including a four-piece heat shield.

* * * * *